(12) United States Patent
Earle et al.

(10) Patent No.: US 9,004,771 B2
(45) Date of Patent: Apr. 14, 2015

(54) BICYCLE BOTTOM BRACKET

(71) Applicant: Praxis Works LLC, Aptos, CA (US)

(72) Inventors: David M. Earle, Watsonville, CA (US); Chin T. Chuang, Dacun Township, Changhua County (TW)

(73) Assignee: Praxis Works LLC, Aptos, CA (US)

( * ) Notice: Subject to any disclaimer, the term of this patent is extended or adjusted under 35 U.S.C. 154(b) by 172 days.

(21) Appl. No.: 13/868,585

(22) Filed: Apr. 23, 2013

(65) Prior Publication Data

US 2013/0230266 A1    Sep. 5, 2013

Related U.S. Application Data

(63) Continuation-in-part of application No. 12/715,152, filed on Mar. 1, 2010, now abandoned.

(60) Provisional application No. 61/244,910, filed on Sep. 23, 2009, provisional application No. 61/156,209, filed on Feb. 27, 2009.

(51) Int. Cl.
| | |
|---|---|
| *F16C 9/00* | (2006.01) |
| *F16C 13/00* | (2006.01) |
| *B60B 27/00* | (2006.01) |
| *B62M 3/00* | (2006.01) |
| *B62K 19/34* | (2006.01) |

(52) U.S. Cl.
CPC ......... *B60B 27/0005* (2013.01); *B60B 27/0078* (2013.01); *B62M 3/003* (2013.01); *B62K 19/34* (2013.01)

(58) Field of Classification Search
CPC ............ B60B 27/0005; B60B 27/0073; B60B 27/023; B62K 19/34; B62M 3/003; F16C 2326/28
USPC .......................... 384/458, 544, 545; 74/594.1
See application file for complete search history.

(56) References Cited

U.S. PATENT DOCUMENTS

| | | | |
|---|---|---|---|
| 605,870 A * | 6/1898 | Gubelmann | 384/545 |
| 622,868 A * | 4/1899 | Simpson | 384/545 |
| 951,137 A | 3/1910 | Lowrance | |
| 4,406,504 A | 9/1983 | Coenen et al. | |
| 4,651,590 A * | 3/1987 | Thun | 74/594.1 |
| 7,152,501 B2 | 12/2006 | Yamanaka et al. | |
| 2004/0045400 A1 | 3/2004 | Alley | |

(Continued)

FOREIGN PATENT DOCUMENTS

DE    3531030 A1    3/1987

OTHER PUBLICATIONS

Jun. 1, 2010, International Search Report of the International Searching Authority from The U.S. Receiving Office, in PCTUS2010025785, which shares the same priority as this U.S. application.
Jun. 1, 2010, Written Opinion of the International Searching Authority from The U.S. Receiving Office, in PCTUS2010025785, which shares the same priority as this U.S. application.

(Continued)

*Primary Examiner* — Phillip A Johnson
(74) *Attorney, Agent, or Firm* — Kolisch Hartwell, P.C.

(57) ABSTRACT

An improved bicycle bottom bracket system and methods of manufacturing and installing such a system. The improved system may include bearings mounted within bearing cups on either side of the bottom bracket shell of a bicycle frame. The bearing cups may be threaded together, and one bearing cup may include a collet portion expandable by the other bearing cup.

25 Claims, 14 Drawing Sheets

(56) References Cited

U.S. PATENT DOCUMENTS

2007/0269155 A1 11/2007 Mori et al.
2009/0045600 A1 2/2009 Garnier

OTHER PUBLICATIONS

Oct. 23, 2012, Office action from U.S. Patent and Trademark Office, in U.S. Appl. No. 12/715,152, which this U.S. application is a continuation-in-part application to.

* cited by examiner

BICYCLE BOTTOM BRACKET

CROSS-REFERENCE TO RELATED APPLICATIONS

This application is based upon and claims the benefit under 35 U.S.C. §119(e) of U.S. Provisional Patent Application Ser. No. 61/156,209, filed Feb. 27, 2009, U.S. Provisional Patent Application Ser. No. 61/244,910, filed Sep. 23, 2009, and is itself a continuation-in-part patent application to U.S. patent application Ser. No. 12/715,152, filed Mar. 1, 2010, all of which are incorporated herein by reference in their entirety for all purposes.

INTRODUCTION

The pedals of a bicycle are generally attached to crankarms on opposite sides of the bicycle frame. The crankarms are typically joined together by a spindle that passes through the frame, rigidly attaching the crankarms at positions that are rotated by 180 degrees relative to each other. This allows the alternating pedaling motion with which all bicycle riders are familiar. Accordingly, bicycles require a bearing assembly to allow for the rotation of the spindle and attached crankarms relative to the frame. This bearing assembly is commonly known as a bottom bracket, and the portion of the bicycle frame through which the assembly passes is commonly known as the bottom bracket shell of the frame.

Traditionally, bottom bracket shells have had standard inner diameters of approximately 34-35 millimeters (mm), with slight variations depending primarily on the geographic region in which the frame is manufactured. For example, the traditional English standard for the inside diameter of a bottom bracket shell is 33.6-33.9 mm, and the corresponding traditional Italian standard is 34.6-34.9 mm. Providing a standard bottom bracket inner diameter allows the manufacture of a variety of different bottom brackets that may be installed within a given bicycle frame.

Several forms of bottom brackets designed to fit within standard sized English and Italian bottom bracket shells have been commonly used in the bicycle industry. One of these is the traditional loose bearing bottom bracket, which includes a spindle incorporating outward facing bearing cones and a bearing cup on each side, at least one of which is adjustable. Loose bearings are installed between the bearing cones and bearing cups, the bearings are lubricated, and the cups are adjusted to allow rotation of the spindle without allowing spindle motion in any other direction. In a loose bearing bottom bracket, the cones, cups and bearings are typically all installed within the bottom bracket shell of the bicycle frame.

Another bottom bracket design that shares some common features with the loose bearing design is the cartridge style bottom bracket. A cartridge bottom bracket is generally a self-contained unit including an integrated spindle and bearings enclosed in bearing cups, all of which are preassembled and configured for easy installation and removal from the bottom bracket shell of the bicycle frame. Integrated seals also may be provided to prevent moisture, dirt and other contaminants from reaching the bearings, and when the cartridge unit wears out, it may simply be removed and replaced. As in the case of a loose bearing bottom bracket, the bearings and bearing cups of a cartridge bottom bracket are typically disposed within the bottom bracket shell of the bicycle frame when the bottom bracket is installed.

Because of the relatively small diameters of traditional bottom bracket shells, designs such as the loose bearing and sealed cartridge design (i.e., designs that dispose the bearings inside the bottom bracket shell of the bicycle frame) can have either relatively large bearings and a relatively thin spindle, or relatively small bearings and a relatively thick spindle. A small diameter spindle is generally undesirable because it is not as stiff or strong as a larger spindle, thus increasing the amount of rider energy lost to flexure of the spindle. Furthermore, to compensate for having a small diameter, loose bearing and cartridge style bottom bracket spindles are typically constructed from a relatively dense material such as steel or a steel alloy, which increases the weight of the bicycle. On the other hand, if a larger diameter spindle is used with these designs, then relatively small bearings must be used, resulting in a significant decrease in durability.

Accordingly, another type of bottom bracket that has found popularity within the bicycle industry in recent years is the external bearing bottom bracket, which also may be referred to as the outboard bearing bottom bracket. In an external or outboard bearing bottom bracket, bearing cups are typically installed into the bicycle frame on either side of the bottom bracket shell, but are configured to house relatively larger bearings outside the shell. Because the bearings are held outside the shell, this allows a relatively large diameter spindle to pass through the shell.

The larger diameter spindle of an external bearing bottom bracket can be made stiffer and stronger than spindles used in internal bearing bottom brackets, and also can be made lighter through an appropriate choice of materials and by making the spindle hollow. However, because external bearing systems typically rely on the precise alignment of threaded bearing cups separately installed in opposite sides of the bottom bracket shell of the bicycle frame, these systems may suffer from the problems of improper bearing alignment and resulting fast bearing wear.

Yet another type of bottom bracket that attempts to improve on previous designs is the oversize direct fit design, an example of which is the BB30 standard introduced by the Cannondale Bicycle Corporation in 2000. In systems of this type, bearings are press fit directly into an oversized (i.e., larger in diameter than the traditional English and Italian designs) bottom bracket shell of the bicycle frame. The bearings are typically disposed within the shell at positions determined by a snap-ring or some other similar retaining device within each side of the shell. Due to an increased bottom bracket shell diameter, these systems allow for the use of larger bearings and a larger diameter spindle than traditional systems, despite the fact that both bearings and spindle are typically disposed within the shell. However, parallel and concentric alignment of the bearings on either side of the shell may be difficult to achieve in direct fit designs, because the alignment of the bearing axes relies on the precise machining of the bottom bracket shell.

Similarly, in existing oversize direct fit bottom bracket designs it may be difficult to precisely control the lateral spacing between the bearings, which is typically determined by the lateral positions of snap-rings or similar components disposed within each side of the bottom bracket shell. Correct lateral spacing is generally correlated to bottom bracket life, because even a slight increase over the correct spacing can allow the crankarms and spindle to shift from side to side during pedaling, a phenomenon also known as "side-play." This results in periodic thrust loading on the bearings and can lead to premature bearing wear. Some direct fit systems side-load the bearings during assembly in an attempt to remove side-play, but this can further accelerate bearing wear due to increased overall bearing friction.

For all of the above reasons, it is desirable to develop a bottom bracket that allows for the use of relatively large diameter bearings and a relatively large diameter spindle, but which reduces the potential for a lack of concentricity and proper spacing between opposing bearings.

SUMMARY

The present teachings relate to an improved bicycle bottom bracket system and methods of manufacturing and installing such a system. The improved system generally includes bearings mounted within bearing cups on either side of the bottom bracket shell of a bicycle frame, and a mechanism designed to result in substantially parallel, concentric alignment of the bearings. For example, in some embodiments, the bearing cups each extend inward into the bottom bracket shell and meet at an alignment interface configured to hold the cups and bearings in parallel concentric alignment and/or at a fixed separation distance. The cups may engage each other at the alignment interface in various ways such as by threaded engagement, slip fitting, or press fitting. When the cups engage each other rotationally, a rotatable bushing may be disposed between one of the cups and the interior surface of the shell to facilitate rotating the cups relative to each other after they are inserted into the shell.

In other embodiments, a single integrated structure including two parallel bearing cups may be inserted through the bottom bracket shell and press fit into each side of the shell, holding the cups in concentric alignment and at a predetermined separation distance from each other. In embodiments of this type, the bearing cups and the bottom bracket shell both may be provided with different inner diameters on each lateral side, to allow the integrated structure to be inserted and secured to each side of the shell.

According to aspects of the present teachings, in various embodiments one or more alignment washers may be disposed between one or both of the bearing cups and the bottom bracket shell, to compensate for imperfections of the shell faces on either side of the frame and to facilitate more accurate alignment of the cups with each other and/or with the central axis of the bottom bracket shell.

In other embodiments, the bearing cups may be configured to mate together, with the left bearing cup including a radially-expandable collet portion. The right bearing cup may be configured to urge the collet portion toward a desired outer diameter when the right bearing cup is inserted into the left bearing cup. This arrangement may facilitate a more secure installation of the bottom bracket system, with a press-fit at both the left end and at the expanded right end of the bottom bracket.

DETAILED DESCRIPTION OF THE INVENTION

Figure 1:
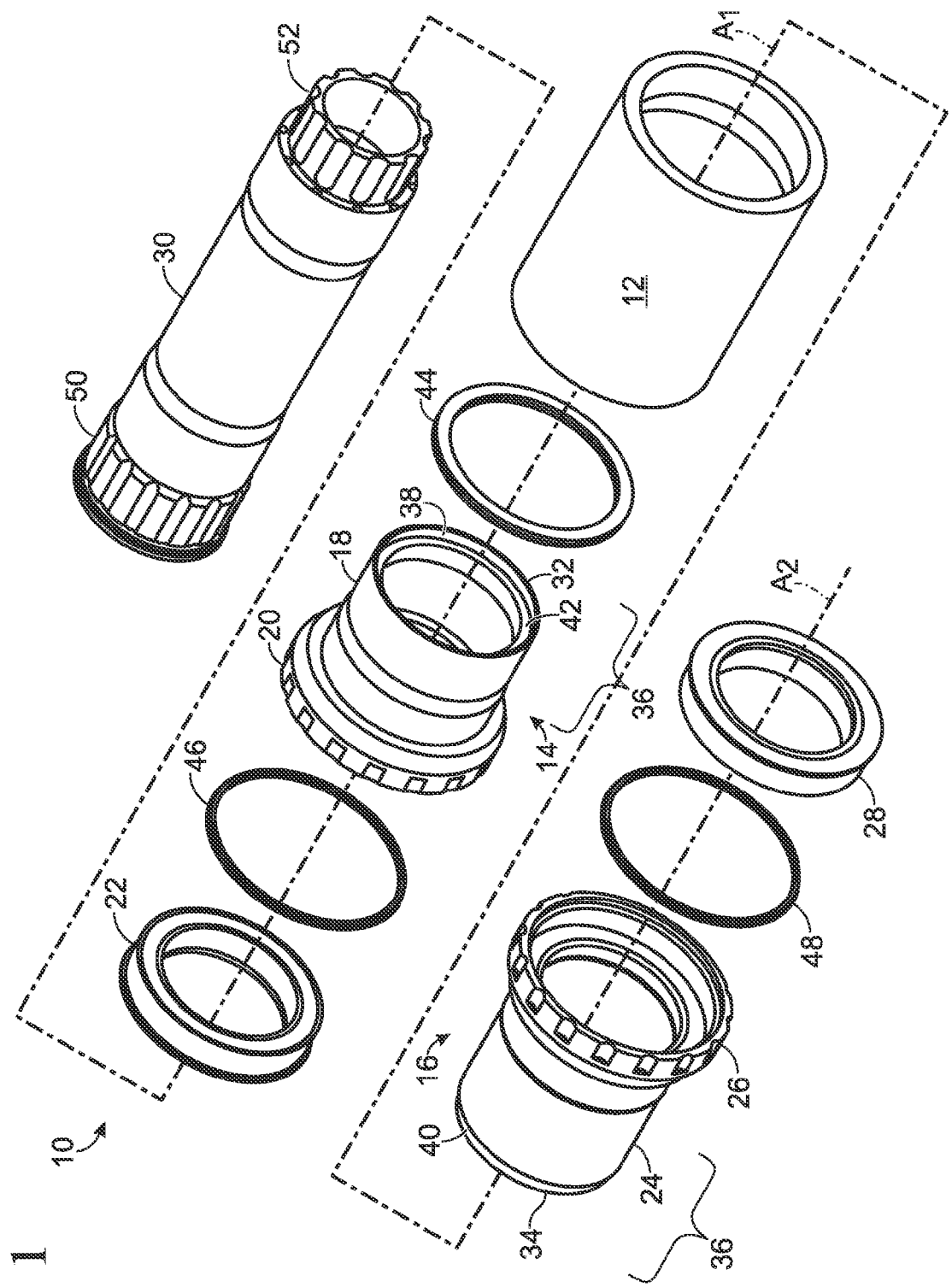
FIG. 1 is an exploded isometric view of a bottom bracket system, according to aspects of the present teachings.

FIG. 1 depicts a first embodiment of a bicycle bottom bracket system, generally indicated at 10. Bottom bracket system 10 includes a bottom bracket shell 12, a left bearing cup generally indicated at 14, and a right bearing cup generally indicated at 16. Shell 12 may be an integrated bottom bracket shell portion of a bicycle frame, or it may be a separate shell which is configured to fit securely within the bottom bracket shell of the bicycle frame, for example by slip fitting, press fitting or the like. For simplicity, shell 12 will be described from this point forward as being an integrated portion of a bicycle frame. However, the other described components of the bottom bracket can also function with an appropriate choice of a separate shell that fits within a bicycle frame.

Left bearing cup 14 defines a left bearing rotation axis $A_1$, which is the axis passing through the center of the left bearing cup and oriented perpendicular to its end faces. The left bearing cup includes a left mounting portion 18 configured to be mounted within a left side portion of shell 12, and a left bearing housing 20 configured to enclose a left bearing 22. Similarly, right bearing cup 16 defines a right bearing rotation axis $A_2$ passing through the center of the right bearing cup and oriented perpendicular to its end faces, a right mounting portion 24 configured to be mounted within a right side portion of shell 12, and a right bearing housing 26 configured to enclose a right bearing 28.

In the embodiment depicted in FIG. 1, left bearing housing 20 and right bearing housing 26 are configured to be disposed outside shell 12 when the bottom bracket is assembled. Accordingly, bearings 22 and 28 will also be disposed outside shell 12, and system 10 may be described as an external or outboard bottom bracket system. The present teachings also contemplate that bearings may be disposed within the bottom bracket shell, and embodiments of this type, which may be characterized as internal or inboard bottom bracket systems, are described later in this specification.

In FIG. 1, a spindle 30 is configured to be disposable through bottom bracket shell 12, left bearing cup 14 and right bearing cup 16. Spindle 30 may be provided with the bottom bracket system, or in some cases may be provided separately, such as with a crankset. As depicted in FIG. 1, the spindle may include machined portions 50, 52 at each end for secure attachment of the left and right portions of a crankset. The spindle will typically have a diameter chosen to conform closely with the inner diameter of the cups, and accordingly may have a larger diameter than the diameter of a traditional English or Italian bottom bracket spindle if shell 12 has a corresponding larger diameter.

For example, due to the oversized diameter of shell 12 that may be used in conjunction with bottom bracket systems according to the present disclosure, it may be possible to use spindles having diameters of 30 mm, 34 mm, or more, as opposed to a maximum diameter of 25 mm allowed by many traditional systems. Accordingly, spindle 30 may be constructed from a relatively lightweight material, such as aluminum, and may be hollow rather than solid as in many traditional bottom bracket systems.

Each of the left and right bearing cups depicted in FIG. 1 further includes an alignment surface. More specifically, left bearing cup 14 includes a first alignment surface 32, and right bearing cup 16 includes a second alignment surface 34. When the left and right bearing cups are mounted within shell 12, respective mounting portions 18 and 24 of the cups extend inward within the shell so that alignment surfaces 32 and 34 contact each other in an alignment region generally indicated at 36. The alignment surfaces are configured such that when they contact each other, left and right bearing rotation axes $A_1$ and $A_2$ are substantially parallel and concentrically aligned with each other. This may be accomplished through precision shaping of the alignment surfaces.

For example, as depicted in FIG. 1, left bearing cup 14 may include a lip 38 configured to securely receive and overlap a complementary lip 40 of right bearing cup 16, allowing alignment surfaces 32 and 34 to abut each other. To the extent that surfaces 32 and 34 are respectively perpendicular to bearing rotation axes $A_1$ and $A_2$, the axes will be parallel to each other when the alignment surfaces abut each other. Furthermore, to the extent that lip 38 and lip 40 fit concentrically together when they overlap, rotation axes $A_1$ and $A_2$ will also be concentric. In this manner, parallel and concentric alignment of the bearing rotation axes may be obtained through precision machining of the portions of the two bearing cups that interface with each other in alignment region 36 within the bottom bracket shell.

In some cases, the alignment surfaces of the bearing cups also may be configured to hold the left and right bearing cups a predetermined distance apart when the left and right bearing cups are mounted within the bottom bracket shell. For example, in the bottom bracket system depicted in FIG. 1, the direct abutment of alignment surface 32 with alignment surface 34 functions as a "hard stop" and fixes the distance between bearing cups 14 and 16 and thus also between bearings 22 and 28 when the bottom bracket is fully assembled. Alternatively or in addition, outer lip 38 may define another transverse surface 42 that extends radially inward from the inner surface of bearing cup 14 and thus functions to stop the distal edge of lip 40 at a predetermined position. In some applications, facilitating the precise axial separation of the left and right bearing cups in this manner may have certain advantages over systems in which the positions of the cups are more variable, for instance by helping to reduce possible side-play of the bearings, as described previously.

Bottom bracket system 10 may include one or more alignment washers such as alignment washer 44 depicted in FIG. 1. Alignment washer 44, which in FIG. 1 is disposed between the outer surface of left bearing cup 14 and the left edge of shell 12 when system 10 is assembled, may facilitate a close fit between bearing cup 14 and the shell, and may be flexible enough to allow cup 14 to move into the desired parallel and concentric orientation and/or separation distance from right cup 16, as determined by the interface of the cups within alignment region 36. A similar alignment washer (not shown in FIG. 1) may be disposed between the right bearing cup and the bottom bracket shell to serve a similar purpose. Accordingly, the alignment washer(s) used with the presently disclosed bottom bracket systems will typically be constructed from a semi-rigid material such as a deformable plastic or metal.

System 10 also may include seals such as o-rings 46 and 48 depicted in FIG. 1. When bearings 22 and 28 are respectively installed within bearing housing portions 20 and 26, these seals are configured to be disposed between the outer diameter of each bearing and the inner diameter of the corresponding bearing housing portion, to prevent water, dirt and other contaminants from reaching the inner bearing surfaces. In some cases, the bearings may fit closely enough within the housings that such seals are not needed, or the bearings and/or bearing housings may include integrated seals.

Figure 2:
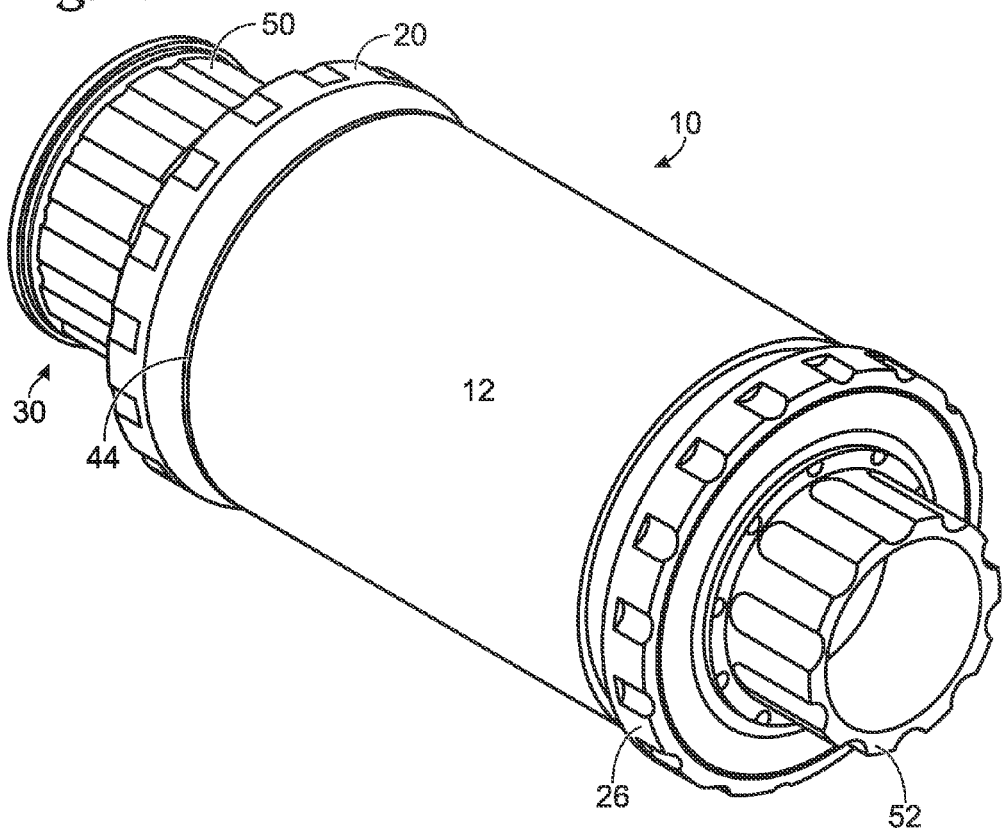
FIG. 2 shows the bottom bracket system of FIG. 1 with all of its components assembled together.

FIG. 2 depicts bottom bracket system 10 in its assembled form within bottom bracket shell 12, including spindle 30 inserted disposed within the bottom bracket. Once system 10 is assembled and installed in a bottom bracket shell as shown in FIG. 2, crankarms (not shown) may be attached to each side of the bottom bracket. As mentioned previously, spindle 30 may be provided with mounting structures such as structures 50, 52 configured to securely receive left and right crankarms. These structures may take various alternate forms to interface with various crankarm designs.

Figure 3:
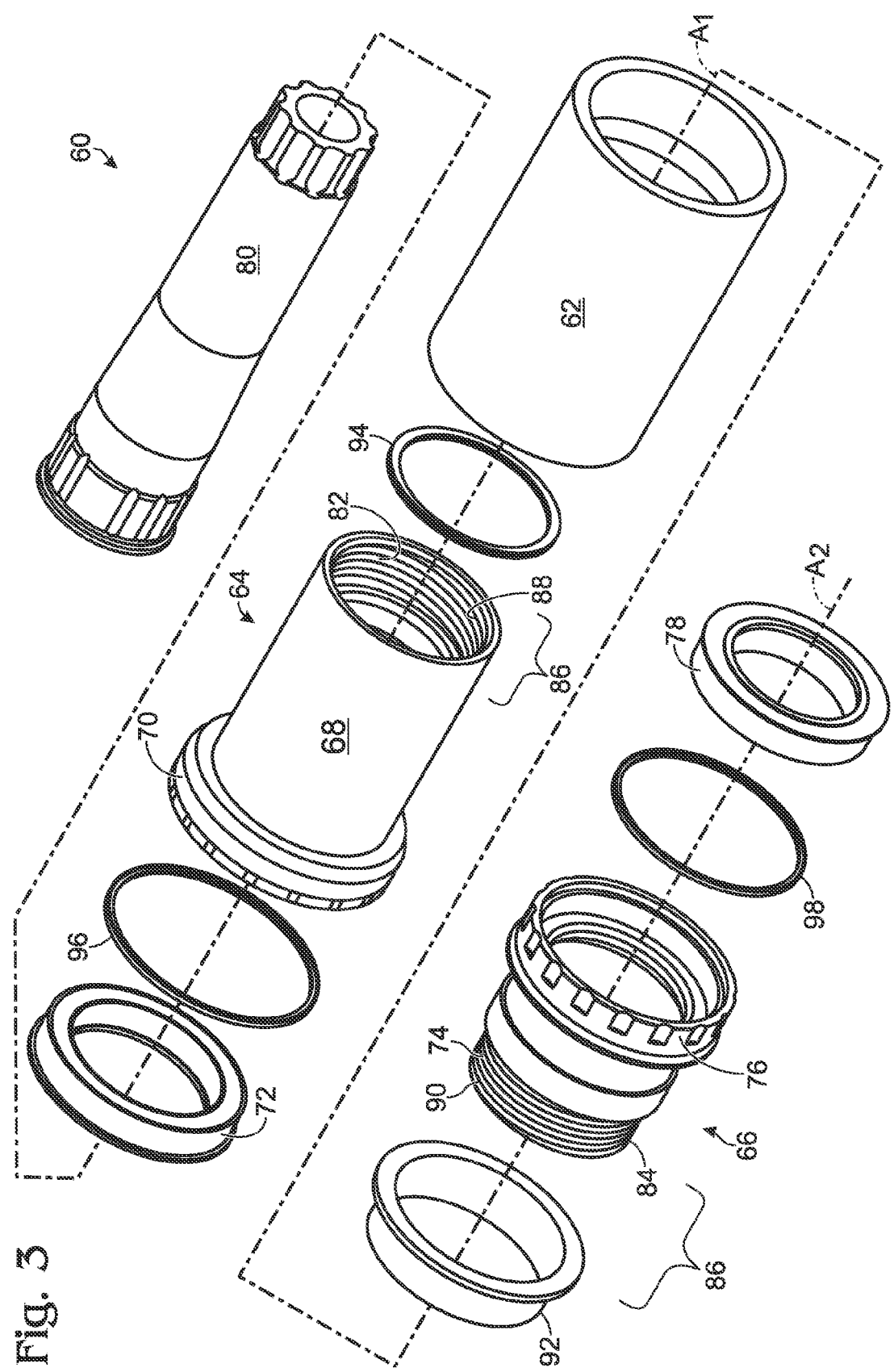
FIG. 3 is an exploded isometric view of an alternative bottom bracket system, according to aspects of the present teachings.

FIG. 3 is an exploded isometric view of an alternative bottom bracket system, generally indicated at 60, according to aspects of the present teachings. System 60 includes a bottom bracket shell 62, which (as in the case of system 10 and all subsequently described systems), will typically be the bottom bracket shell portion of a bicycle frame, but may in some cases be a separate shell portion configured to fit within the bicycle frame. System 60 also includes a left bearing cup generally indicated at 64, and a right bearing cup generally indicated at 66.

As described with respect to system 10 of FIG. 1, the left bearing cup defines a left bearing rotation axis $A_1$, and the right bearing cup defines a right bearing rotation axis $A_2$. Also similarly to system 10, left bearing cup 64 includes a left mounting portion 68 configured to be mounted within a left side portion of shell 62 and a left bearing housing 70 configured to enclose a left bearing 72, and right bearing cup 66 includes a right mounting portion 74 configured to be mounted within a right side portion of shell 72 and a right bearing housing 76 configured to enclose a right bearing 78.

Because, as FIG. 3 indicates, bearings 72 and 78 will be disposed outside shell 62 when system 60 is assembled, system 60 may be characterized as an external or outboard bottom bracket system. A spindle 80, disposable through bottom bracket shell 62, left bearing cup 64 and right bearing cup 66, may be provided either as part of system 60 or separately with a crankset. As noted previously, the spindle may include various configurations of machined portions for secure attachment of crankarms having various designs. If shell 62 has a relatively large diameter compared to traditional bottom bracket systems, spindle 80 may be constructed of a relatively light weight material and/or may be hollow, due to the possibility of a relatively large diameter spindle.

Left bearing cup 64 includes a first alignment surface 82, and right bearing cup 66 includes a second alignment surface 84. When the left and right bearing cups are mounted within shell 62, mounting portions 68 and 74 of the cups extend inward within the shell so that alignment surfaces 82 and 84 come into contact each other in an alignment region generally indicated at 86. The alignment surfaces are configured such that when they contact each other, left and right bearing rotation axes $A_1$ and $A_2$ are substantially concentrically aligned with each other.

In the system depicted in FIG. 3, alignment surfaces 82 and 84 are configured for threaded engagement. More specifically, alignment surface 82 includes a plurality of internal threads 88 on the inner surface of mounting portion 68, and alignment surface 84 includes a plurality of complementary external threads 90 on the outer surface of mounting portion of 74, in a region having a smaller diameter than the inner diameter of mounting portion 68. Thus, left bearing cup 64 and right bearing cup 66 may be engaged within shell 62 by rotating the cups relative to each other to engage threads 88 with threads 90. To facilitate this rotation after the cups are inserted into the shell, a bushing 92 may be provided. Bushing 92 is configured to fit concentrically between the outer surface of right bearing cup 66 (or more generally, the outer surface of the cup having external threads) and the inner surface of the shell, to allow sufficient rotation of the right bearing cup with respect to the left bearing cup so that the cups can be engaged rotationally.

By virtue of their threaded engagement, axis $A_1$ of bearing cup 64 and axis $A_2$ of bearing cup 66 (and thus bearings 72 and 78) can attain substantially parallel, concentric alignment. Furthermore, the bearing cups may be rotated with respect to each other by an adjustable amount, to attain any suitable separation between the cups. In some cases, it may be appropriate to rotate the cups relative to each other until the threads of the cups are entirely engaged with each other, and this may correspond to a desired separation distance of the cups. Similarly, it may be desirable to rotate the cups until a "hard stop" is reached, for instance when end portions of the cups having overlapping diameters come into contact with each other. In other cases, however, it may be desirable to rotate the cups by a lesser amount, to accommodate a longer spindle or to allow fine adjustment of the bearing separation distance. The threaded design of system 60 allows all of these possibilities.

System 60 also may include an alignment washer 94 configured to be disposed between the left cup and the shell, an alternative or additional alignment washer (not shown) configured to be disposed between the right cup and the shell, and one or more seals such as o-rings 96 and 98 configured to be disposed between the bearings and cups. These components serve the same purposes as those described for the corresponding components of system 10 of FIG. 1, and accordingly will not be described again in detail.

Figure 4:
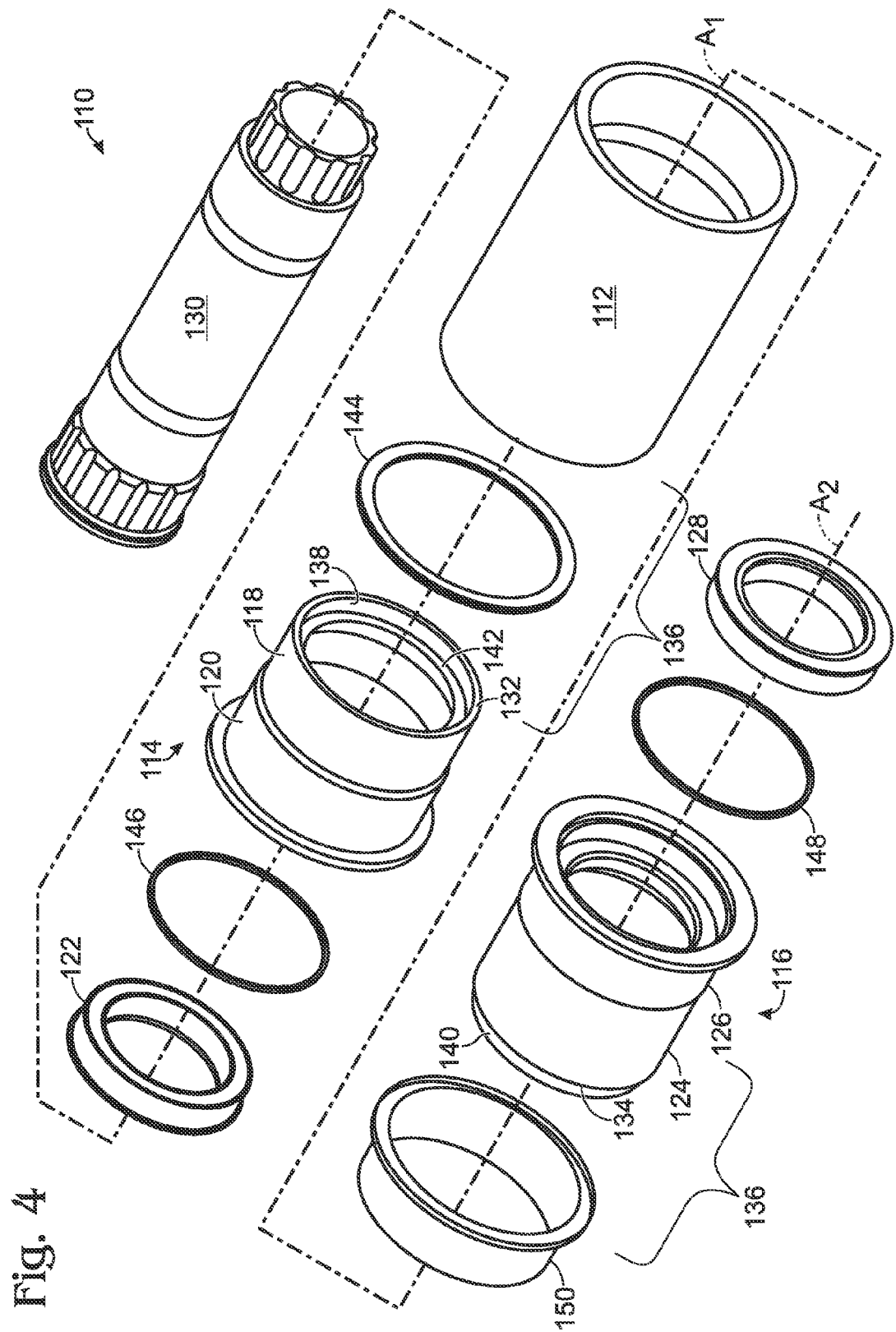
FIG. 4 is an exploded isometric view of a second alternative bottom bracket system, according to aspects of the present teachings.

FIG. 4 is an exploded isometric view of another alternative bottom bracket system, generally indicated at 110, according to aspects of the present teachings. Many aspects of system 110 are similar to corresponding aspects of system 10, and the components of system 110 are numbered accordingly to correspond to the similar components of system 100.

Specifically, a bottom bracket shell 112 may be the bottom bracket shell portion of bicycle frame or a dedicated shell portion of system 110 configured to fit within a bicycle bottom bracket shell. A left bearing cup generally indicated at 114 and a right bearing cup generally indicated at 116 include respective mounting portions 118 and 124 configured to be mounted within the bottom bracket shell, and respective bearing housing portions 120 and 126 configured to house bearings 122 and 128. Spindle 130 is configured to pass through and be disposed within the other portions of the assembled system.

Bearing housing portions 120 and 126 of system 110 are configured to fit within shell 112, along with bearing cup mounting portions 118 and 124. Accordingly, bearings 122 and 128 will also be disposed within shell 112 when the bottom bracket system is fully assembled, and system 110 therefore may be characterized as an internal or inboard bearing bottom bracket system. More specifically, bottom bracket system 110 of FIG. 4 may be viewed as the internal bearing version of external bearing system 10 depicted in FIG. 1.

Accordingly, the bearing cups of system 110 are provided with alignment surfaces similar to those of system 10. Specifically, left bearing cup 114 includes a first alignment surface 132, and right bearing cup 116 includes a second alignment surface 134. When the left and right bearing cups are mounted within shell 112, respective mounting portions 118 and 124 of the cups extend inward within the shell so that alignment surfaces 132 and 134 contact each other in an alignment region generally indicated at 136. The alignment surfaces are configured such that when they contact each other, left and right bearing rotation axes $A_1$ and $A_2$ are substantially concentrically aligned with each other. As described previously, this may be accomplished through precision shaping of the alignment surfaces.

For example, as depicted in FIG. 4, left bearing cup 114 may include a lip 138 configured to securely receive and overlap a complementary lip 140 of right bearing cup 116, allowing alignment surfaces 132 and 134 to abut each other. To the extent that surfaces 132 and 134 are respectively perpendicular to bearing rotation axes $A_1$ and $A_2$, the axes will be parallel to each other when the alignment surfaces abut each other. Furthermore, to the extent that lip 138 and lip 140 fit concentrically together when they overlap, rotation axes $A_1$ and $A_2$ will also be concentric. In this manner, parallel and concentric alignment of the bearing rotation axes may be obtained through precision machining of the portions of the two bearing cups that interface with each other in alignment region 136 within the bottom bracket shell.

In the bottom bracket system depicted in FIG. 4, the direct abutment of alignment surface 132 with alignment surface 134 also may fix the distance between bearing cups 114 and 116 and thus also between bearings 122 and 128 when the bottom bracket is assembled. Alternatively or in addition, outer lip 138 may define another transverse surface 142 that extends radially inward from the inner surface of bearing cup 114 and thus functions to stop the distal edge of lip 140 at a predetermined position. As described previously, precise axial separation of the left and right bearing cups may reduce possible side-play of the bearings, leading to greater longevity of the bottom bracket system.

Bottom bracket system 110 may include one or more alignment washers such as alignment washer 144 disposed between the outer surface of left bearing cup 114 and the left edge of shell 112, another similar alignment washer (not shown) disposed between the right bearing cup and the bottom bracket shell, and seals such as o-rings 146 and 148 disposed between the outer diameter of each bearing and the inner diameter of the corresponding bearing housing portion. These components serve the same purposes as the corresponding components of previously described embodiments, and accordingly will not be described again in detail.

In system 110, a bushing 150 optionally may be provided and configured to be disposed between the outer diameter of the bearing cup and the inner diameter of the bottom bracket shell, to allow bearing cup 116 to be rotated with respect to the shell and the other bearing cup 114. As described previously with respect to bottom bracket system 60 depicted in FIG. 3, bushing 150 might be particularly useful if the bearing cups are threaded (not shown in FIG. 4) to allow rotational engagement of the cups and possible corresponding secure attachment of the cups and flexibility in the bearing separation distance.

Figure 5:
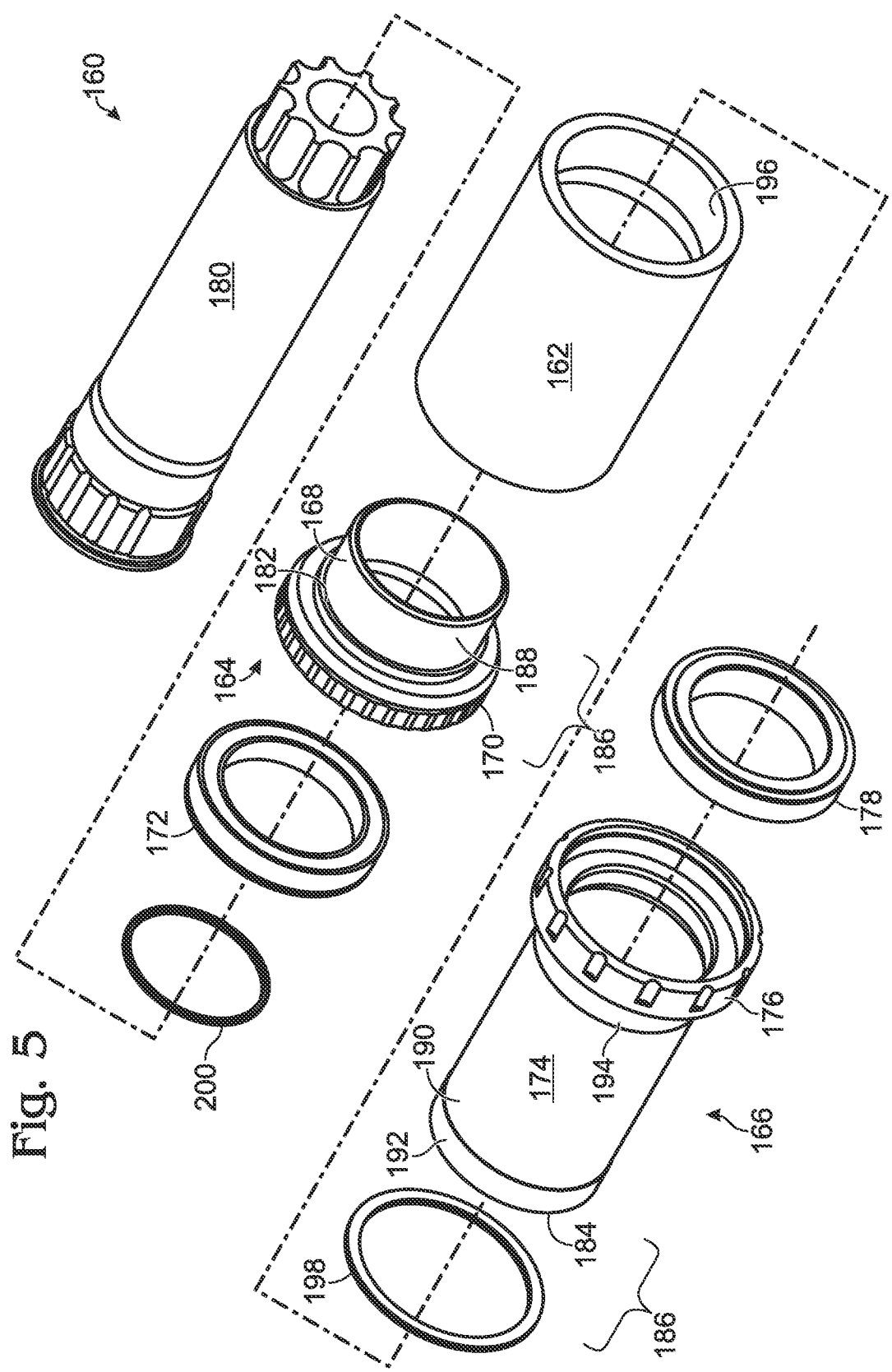
FIG. 5 is an exploded isometric view of a third alternative bottom bracket system, according to aspects of the present teachings.

FIG. 5 is an exploded isometric view of yet another alternative bottom bracket system, generally indicated at 160, according to aspects of the present teachings. System 160 is similar to the previously described systems in that it includes a bottom bracket shell 162 (which again may be part of a bicycle frame), a left bearing cup generally indicated at 164, and a right bearing cup generally indicated at 166. Furthermore, left bearing cup 164 includes a left mounting portion 168 and a left bearing housing 170 configured to receive a left bearing 172, and right bearing cup 166 includes a right mounting portion 174 and a right bearing housing 176 configured to receive a right bearing 178. A spindle 180 may be provided with the system (or with a separate crankset as described above) and configured to pass through and be disposed within the bearing cups, the bearings and the shell. Because both bearing cups are configured to enclose their respective bearings outside shell 162, system 160 may be characterized as an external or outboard bearing bottom bracket system.

Left bearing cup 164 includes an alignment surface 182, and right bearing cup includes another alignment surface 184. These two alignment surfaces are configured to cause the bearing cups and their associated bearings to be disposed in substantially parallel, concentric alignment when the bottom bracket is assembled, as has been described above. Specifically, the two cups are configured to overlap and contact each other in an alignment region 186 when the bottom bracket is assembled, with an inner sleeve portion 188 of left cup 164 sliding within a corresponding outer sleeve portion 190 of right cup 166 until alignment surface 182 makes contact with alignment surface 184 through direct abutment. To the extent that the alignment surfaces are machined precisely, this results in substantial alignment of the two cups, and also results in the cups being separated by a desired separation distance.

As depicted in FIG. 5, right bearing cup 166 is elongated to extend through a substantial portion, or in some cases the entirety, of the length of bottom bracket shell 162. This may, for example allow the right cup to be press fit into both ends of the shell. More specifically, as FIG. 5 shows, a left distal portion 192 of mounting portion 174 of the right bearing cup may be configured to be press fit into a corresponding radially machined portion (not indicated in FIG. 5) at the left distal end of shell 162, and a right distal portion 194 of mounting portion 174 of the right bearing cup may be configured to be press fit into a corresponding radially machined portion 196 at the right distal end of shell 162.

Distal portions 192 and 194 may be given different diameters than the remainder of mounting portion 174, and/or radially machined portion 196 (along with the corresponding radially machined portion at the left side of the shell) may be given different diameters than the other portions of the shell. This may facilitate passing the mounting portion of the right bearing cup through the shell and then mounting it to the shell. Furthermore, also to facilitate mounting, distal portions 192 and 194 of the bearing cup may be provided with different diameters than each other. These features will be discussed again with respect to the system depicted in FIG. 7.

For instance, distal portion 192 may be provided with a smaller diameter than portion 194, to pass through machined portion 196 of the shell. The corresponding left-hand distal machined portion of the shell also may be provided with a matching smaller diameter than the central portion of the shell, to allow secure mounting of portion 192 of the bearing cup. In this fashion, the present teachings contemplate mounting a single bearing cup securely within a bottom bracket shell by a single press fitting operation that secures both distal ends of the cup to corresponding portions of the shell. One or more alignment washers such as washer 198, and one or more seals such as o-ring 200, also may be provided with system 160. The purpose of these components has already been described above.

Figure 6:
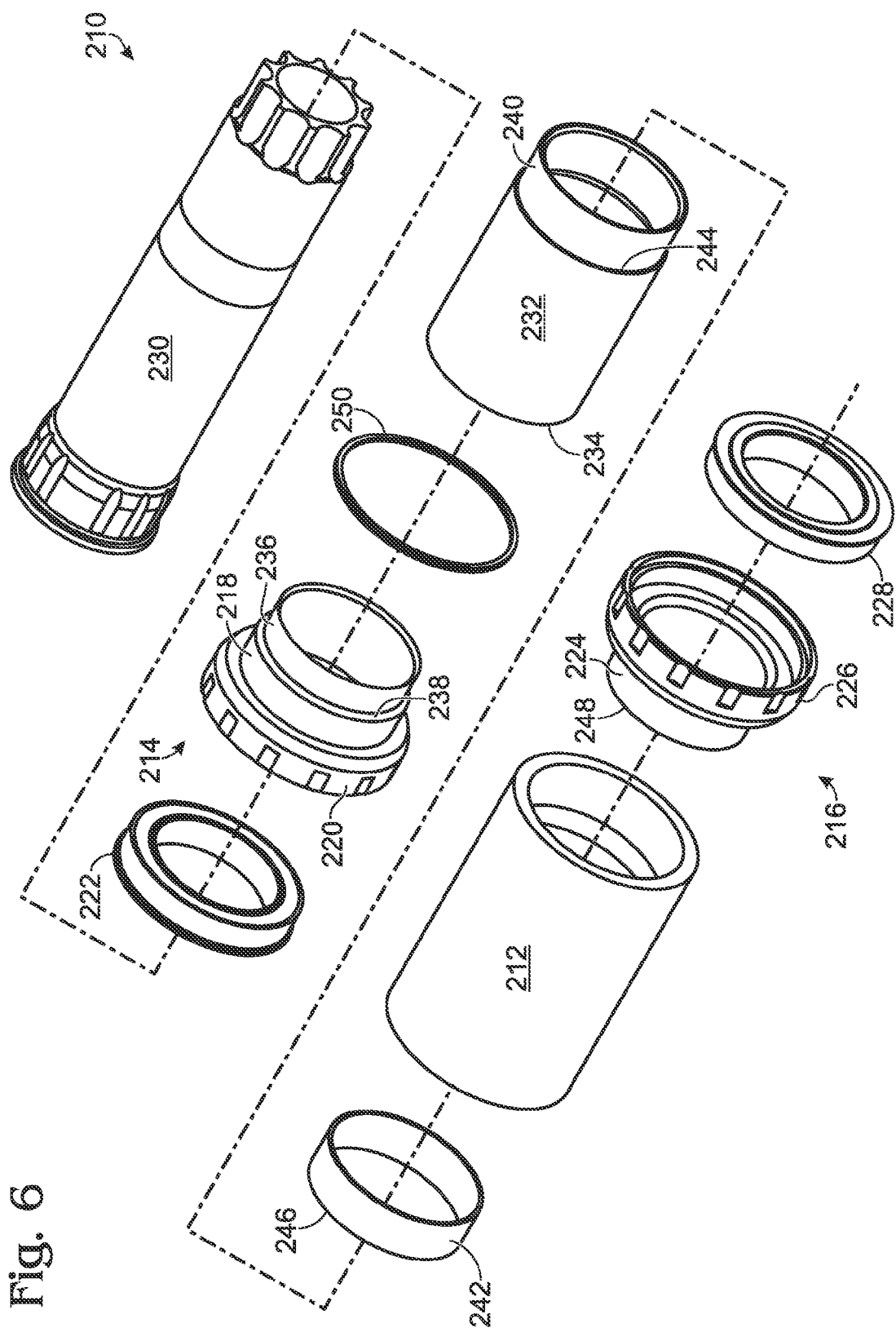
FIG. 6 is an exploded isometric view of a fourth alternative bottom bracket system, according to aspects of the present teachings.

FIG. 6 is an exploded isometric view of still another alternative bottom bracket system, generally indicated at 210, according to aspects of the present teachings. System 210 is similar in most respects to system 160 of FIG. 5. A bottom bracket shell 212 may be provided with the system or may be an integrated portion of a bicycle frame. A left bearing cup generally indicated at 214 and a right bearing cup generally indicated at 216 include respective mounting portions 218 and 224 configured to be mounted within the bottom bracket shell, and respective bearing housing portions 220 and 226 configured to house bearings 222 and 228. Spindle 230 is configured to pass through and be disposed within the other portions of the assembled system.

Unlike in the previously described systems, however, the bearing cups of system 210 are not configured to contact each other directly. Rather, a cylindrical spacer 232 is configured to be disposed between the left and right bearing cups and to make contact with each cup. Spacer 232 and cups 214, 216 may be shaped so that when the system is assembled, the cups and their associated bearings are in substantially parallel, concentric alignment, just as in the previously described systems.

For example, as depicted in FIG. 6, a left edge 234 of spacer 232 may be configured to overlap a lip portion 236 of left bearing cup 214 and to make direct abutting contact with a radial ledge 238 of the left bearing cup. Furthermore, a right lip portion 240 of spacer 232 may be configured to slide between mounting portion 224 of right bearing cup 216 and a cylindrical bushing 242, so that a radial ledge 244 of the spacer makes direct abutting contact with a left side 246 of bushing 242, which in turn makes abutting contact with a left side 248 of mounting portion 224 of the right bearing cup. Alternatively, the spacer may be provided with a smaller diameter right lip portion (not shown) configured to slide directly within mounting portion 224, in which case radial ledge 244 of the spacer may make direct abutting contact with left side 248 of mounting portion 224.

If bearing cups 214, 216 and spacer 232 are machined precisely, integration of the two bearing cups with the spacer in the manner described above can lead to a desired degree of parallel, concentric alignment of the bearing cups and thus of the bearing axes. One or more alignment washers such as alignment washer 250 may be disposed between one or both bearing cups and the shell to compensate for any imperfections of the shell faces and thus to facilitate proper alignment. As should also be apparent, the length of the intermediate spacer can be chosen to result in any desired separation distance between the bearing cups. Furthermore, additional features (not shown in FIG. 6) such as o-ring seals, threaded engagement of the bearing cups with the spacer, and/or regions of the bearing cups configured to be press fit directly into shell 212, all of which have been described previously, may be incorporated into system 210.

Figure 7:
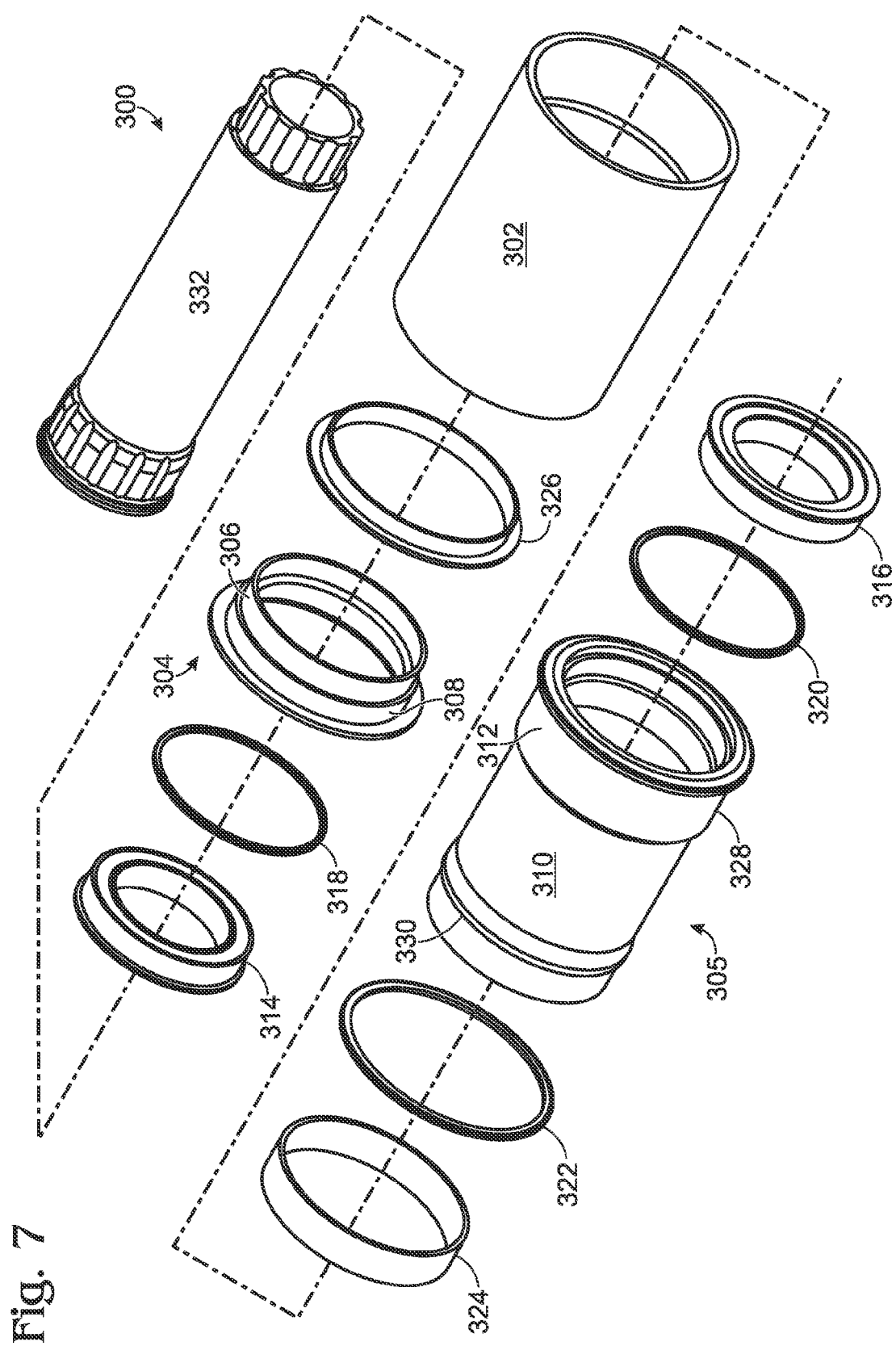
FIG. 7 is an exploded isometric view of a fifth alternative bottom bracket system, according to aspects of the present teachings.

FIG. 7 is an exploded isometric view of yet another bicycle bottom bracket system, generally indicated at 300, according to aspects of the present teachings. System 300 includes bottom bracket shell 302, a left bearing cup generally indicated at 304, and a right bearing cup generally indicated at 305. Left bearing cup 304 includes a left shell mounting portion 306 and a left bearing housing portion 308, and right bearing cup 305 includes a right shell mounting portion 310 and a right bearing housing portion 312. Left bearing housing portion 308 is configured to enclose a left bearing 314 within shell 302, and right bearing housing portion 312 is configured to enclose a right bearing 316 within shell 302. Accordingly, system 300 may be viewed as an internal or inboard bearing bottom bracket system.

System 300 includes several features common to various previously described embodiments. For instance, seals or o-rings 318, 320 may be provided between the bearings and their respective housings to prevent moisture and grit from reaching the inner surface of each bearing. A semi-rigid alignment washer 322 may be provided and configured to be disposed between a portion of the right bearing cup and the shell. A spacer or compression sleeve 324 may abut each of the bearing cups of the assembled system, to facilitate substantially parallel and concentric alignment of the cups and thus of the bearings. A bushing 326 may be configured to encircle a portion of left bearing cup 304, to facilitate rotation of the cup within the bottom bracket shell in the event of threaded engagement of any internal portions of the system with each other. All of these features have been described in more detail above with respect to previously described systems, and serve similar purposes in system 300.

However, system 300 of FIG. 7 is distinct from the previously described systems in that right bearing cup 305 includes more clearly defined distal portions 328, 330 having differing diameters. Specifically, left distal portion 330 of the right bearing portion has a smaller outer diameter than right distal portion 328 of the right bearing portion. The present teachings contemplate that bottom bracket shell 302 may be provided with a correspondingly smaller internal diameter at its left side than at its right side, so that right bearing cup 305 may be inserted into shell 302 and press fit into both sides of the shell simultaneously. Left bearing cup 304 then may be installed and engaged with the right bearing cup in any suitable manner such as direct abutment, threaded engagement, slip fitting, or press fitting, to attain substantially parallel and concentric alignment of the axes of the two bearing cups and thus of the bearing rotation axes. A spindle 332 then may be inserted through the remainder of the assembly, and crankarms may be attached.

Figure 8:
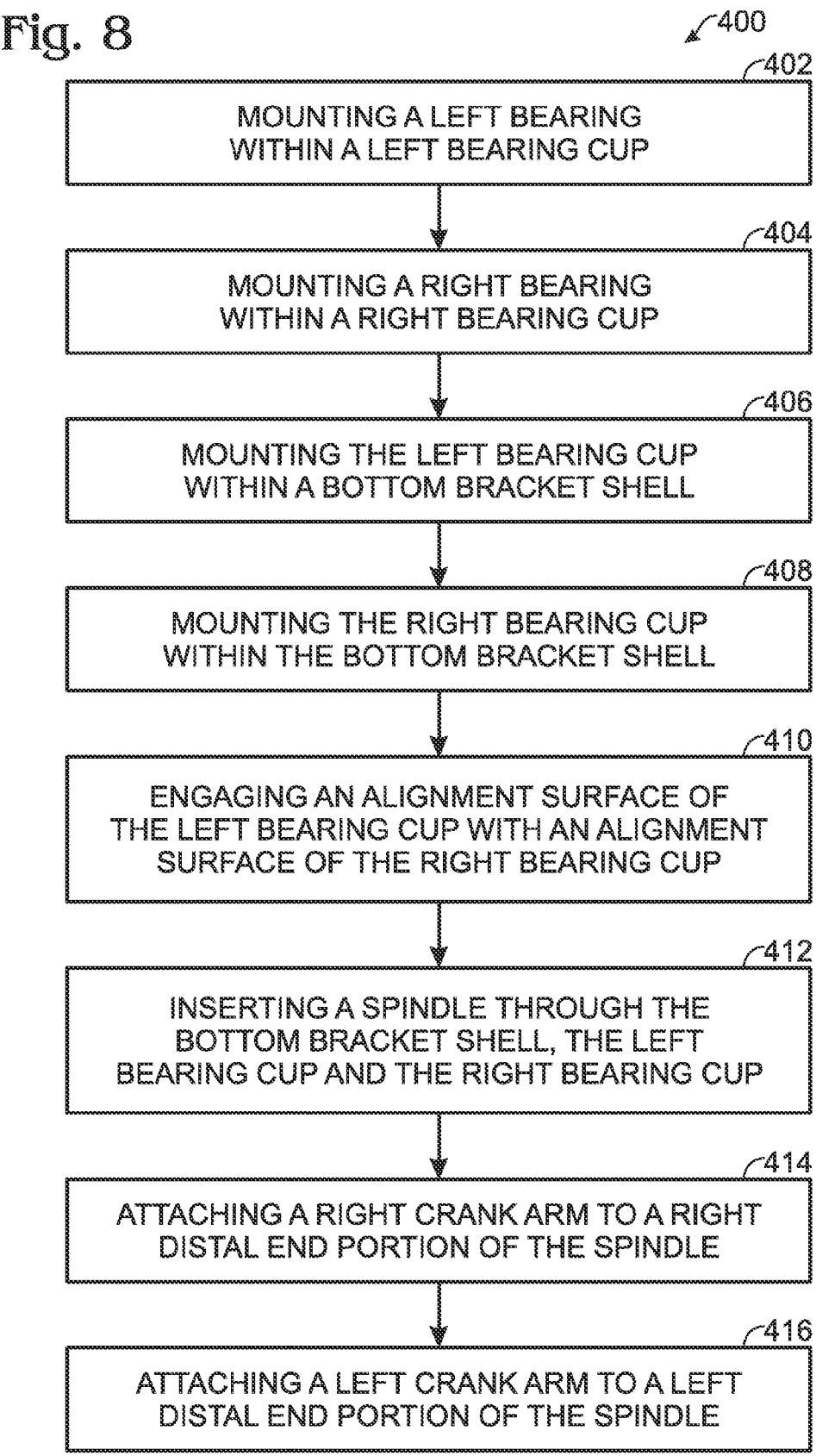
FIG. 8 is a flowchart depicting a method of installing a bottom bracket in a bicycle frame, according to aspects of the present teachings.

FIG. 8 is a flowchart depicting a method, generally indicated at 400, of installing a bottom bracket in a bicycle frame according to aspects of the present teachings. At step 402, a left bearing is mounted or enclosed within a left bearing cup, and at step 404, a right bearing is mounted or enclosed within a right bearing cup. The bearings may take any suitable form, such as spherical ball bearings disposed within a cylindrical bearing race. Suitable bearings may be selected with an appropriate grade representing the bearing quality, and may be constructed from various materials such as steel or a ceramic material. In some cases, the bearings may be sealed in a cartridge prior to mounting in the bearing cups, or may be integrated with a spindle.

At step 406, the left bearing cup is mounted to a bottom bracket shell, and at step 408, the right bearing cup is mounted to the bottom bracket shell. As described previously, mounting the bearing cups to (i.e., at least partially within) the shell may involve various techniques such as threading, slip fitting or press fitting. Also as noted above, the bottom bracket shell will typically be an integrated portion of a bicycle frame, but may in some cases be a separate shell that is later mounted within a portion of the bicycle frame.

At step 410, an alignment surface of the left bearing cup is engaged with an alignment surface of the right bearing cup. The alignment surfaces of the cups may take any of the various forms that have been described with reference to FIGS. 1-7, such as overlapping lip or sleeve portions, or complementary threaded portions, among others. Engagement of the alignment surfaces of the cups with each other will generally result in substantially parallel concentric alignment of the rotational axes of the bearing cups and thus of the bearings when they are mounted in the cups. In some cases, such as when the alignment surfaces include abutting portions or the like, engagement of the cups also may result in a predetermined separation distance between the cups and thus between the bearings.

At step 412, a spindle is inserted through the bottom bracket shell, the left bearing cup and the right bearing cup. This step will be performed separately from bearing and bearing cup mounting when the bearings and bearing cups are provided without an integrated spindle. In some cases, however, the spindle may be integrated with one or more of the cups and/or with one or more of the bearings, in which case inserting the spindle through the shell may be performed in conjunction or simultaneously with mounting the bearings and/or bearing cups. As described above, the spindle will generally have a diameter chosen to conform to the inner diameters of the bearings and bearing cups, which may be either a traditional English or Italian diameter or an oversized diameter, depending on the application. Similarly, the spindle may be constructed of a material suited to its application, such as steel or a steel alloy in the case of traditional bottom bracket geometry, or a less dense material such as aluminum in the case of an oversized geometry. In some cases, particularly if the spindle is oversized in diameter, the spindle may be hollow to reduce its weight.

At steps 414 and 416, right and left crankarms are respectively attached to right and left distal end portions of the spindle. The spindle may be constructed with various mounting structures at its ends to facilitate this attachment. Furthermore, in some cases, the spindle may be preassembled with one or the other of the crankarms, in which case one of steps 414, 416 will not be performed during installation of the bottom bracket. Various additional steps, such as lubrication, sealing, and adjustment (not depicted in FIG. 8) also may be performed during bottom bracket installation.

Figure 9:
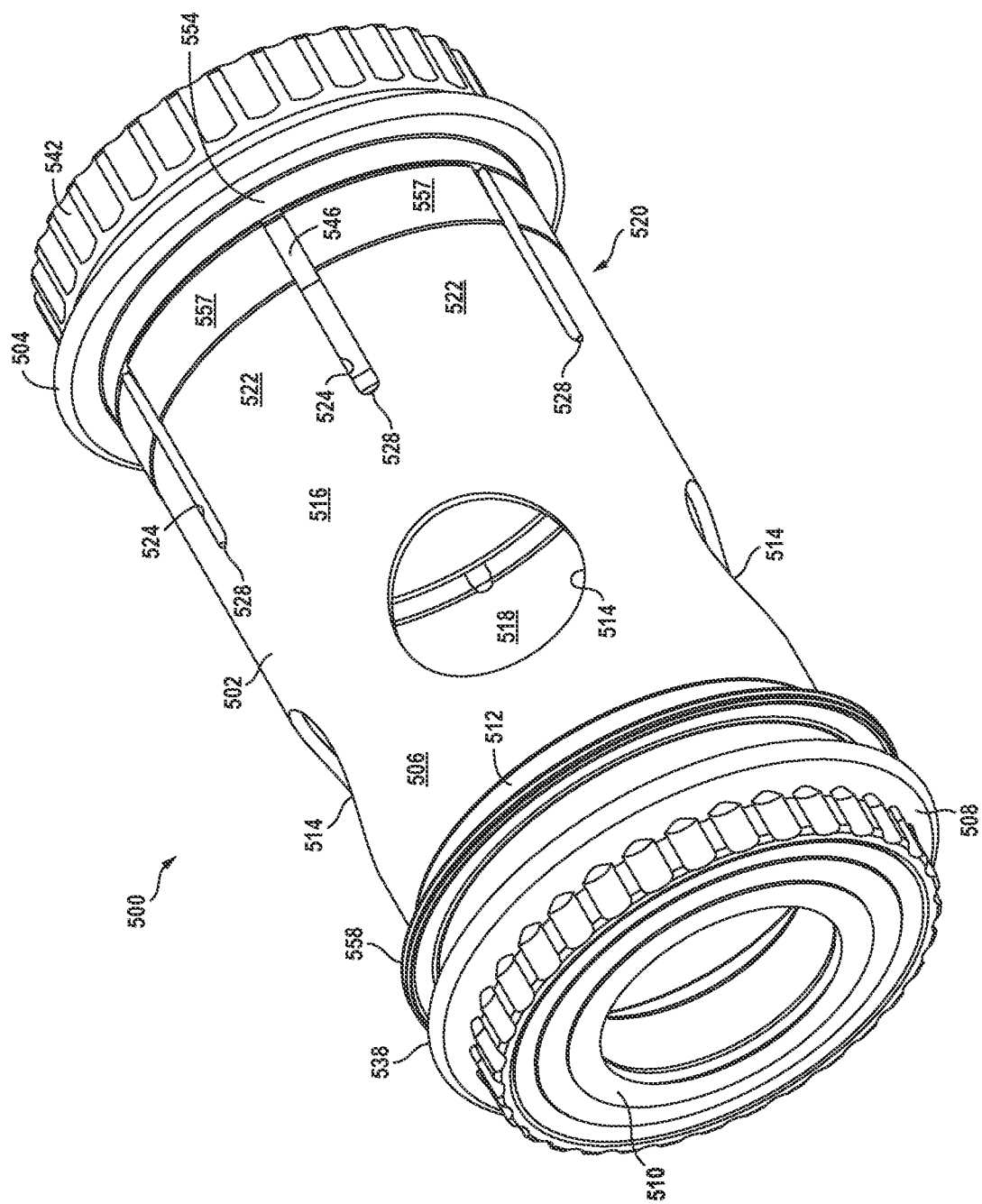
FIG. 9 is an assembled isometric view of a sixth alternative bottom bracket system, according to aspects of the present teachings.
Figure 10:
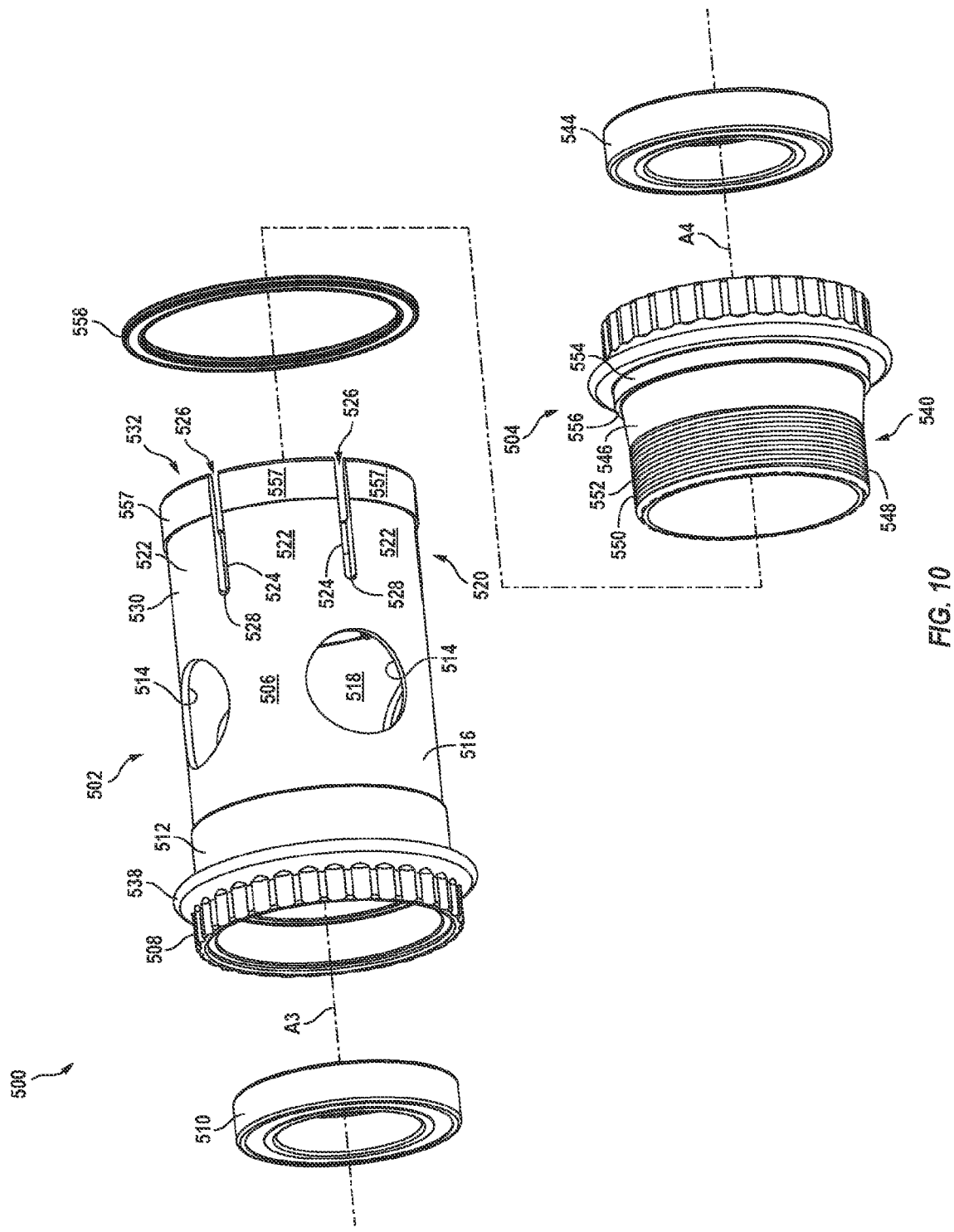
FIG. 10 is an exploded isometric view of the system of FIG. 9.
Figure 11:
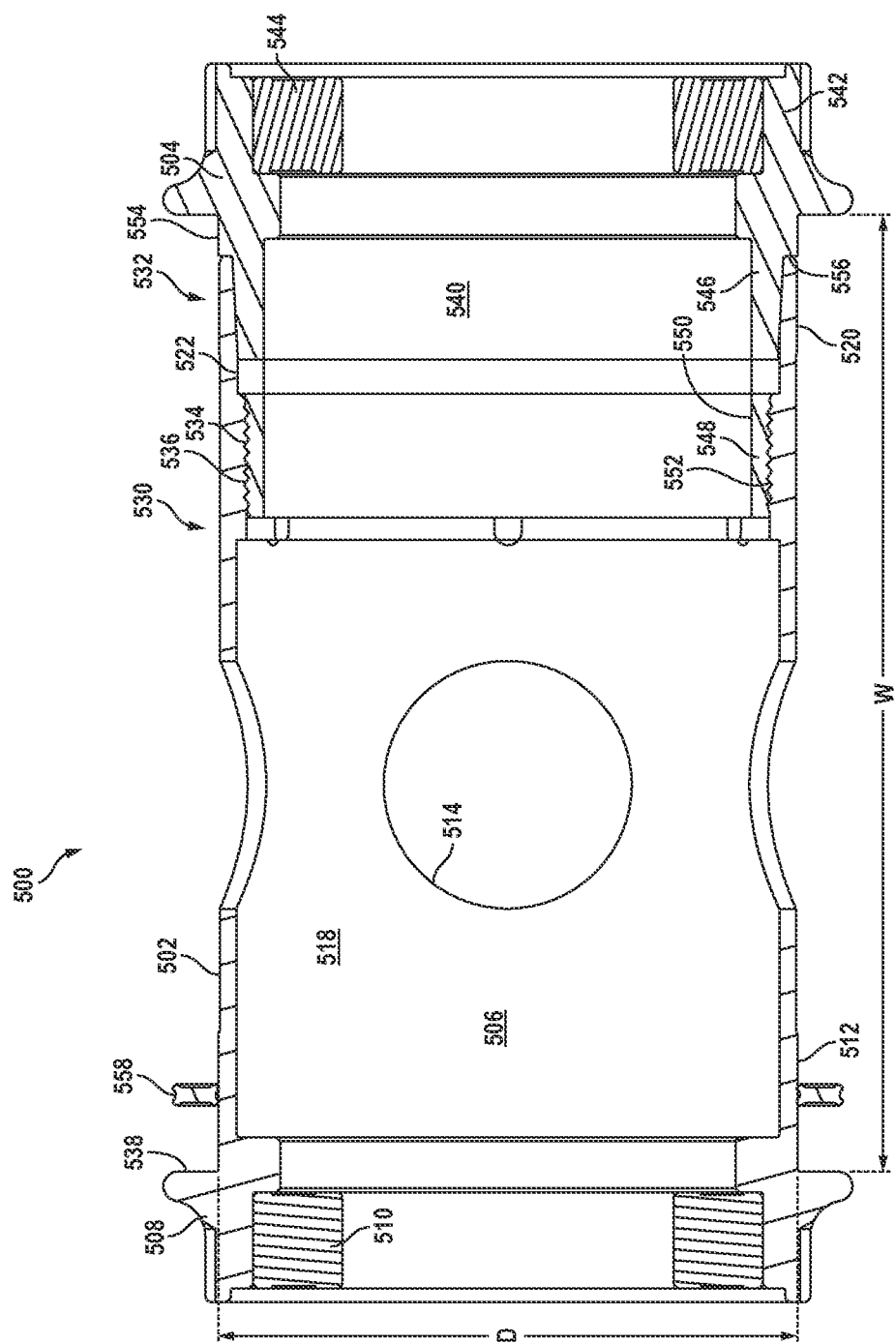
FIG. 11 is a sectional view of the system of FIG. 9.
Figure 12:
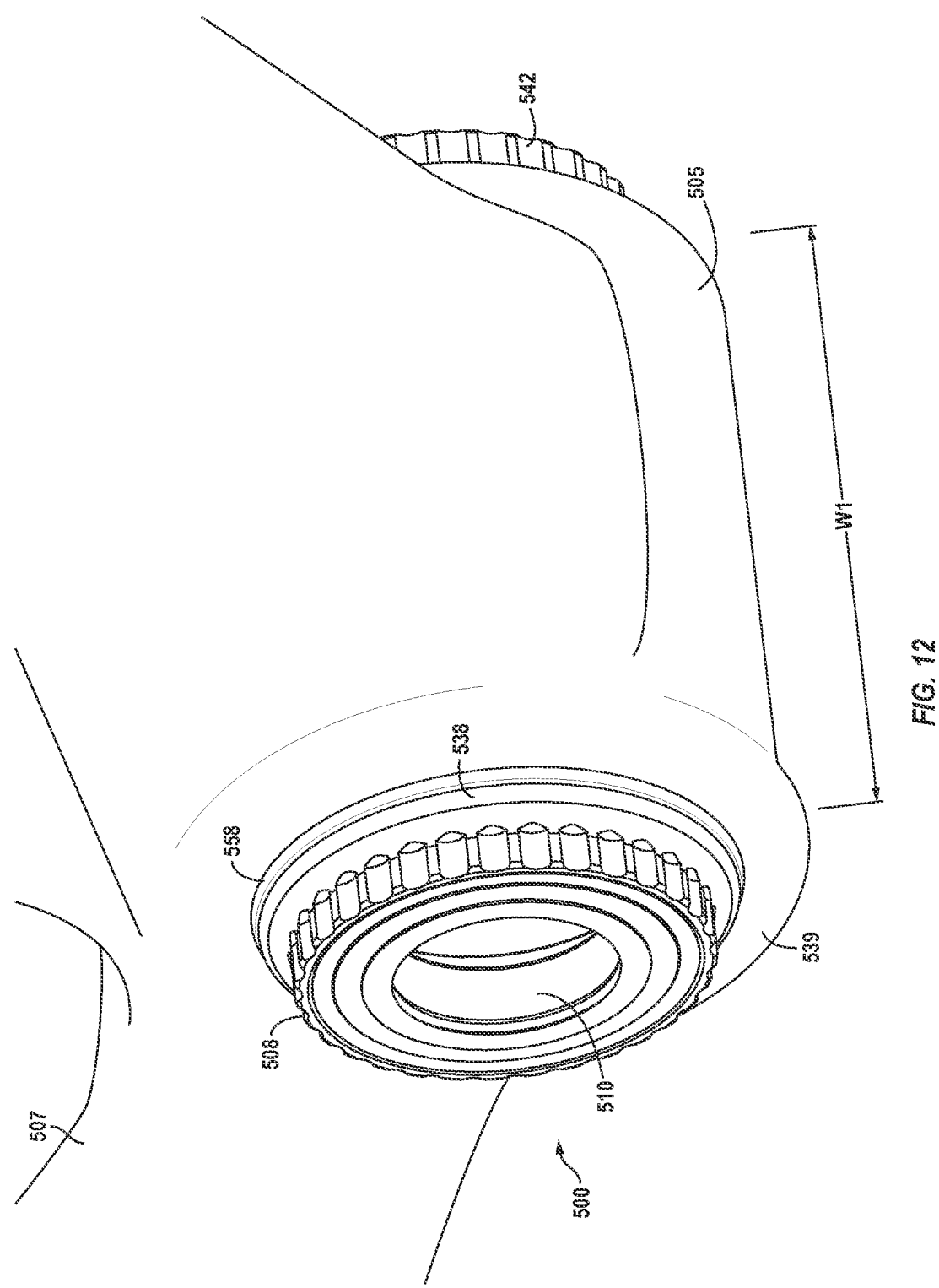
FIG. 12 is a perspective view showing the system of FIG. 9 installed in a bottom bracket shell of an illustrative bicycle.

FIGS. 9-12 are various views of yet another bicycle bottom bracket system, generally indicated at 500, according to aspects of the present teachings. FIG. 9 is an isometric assembled view, FIG. 10 is an isometric exploded view, FIG. 11 is a sectional view, and FIG. 12 is a perspective view of an assembled and installed system 500.

Bottom bracket system 500 includes a left bearing cup 502 and a right bearing cup 504. For convenience, the non-drive side of the bottom bracket may be referred to as the "left" side and the drive side of the bottom bracket may be referred to as the "right" side, as these reflect the standard arrangement for a typical bicycle. Accordingly, the terms may be used interchangeably. However, a system having the sides reversed, i.e., with the drive side on the left, is also contemplated and would be completely within the teachings of the present disclosure. As in other embodiments described above, bottom bracket system 500 may be installed or mounted in a bottom bracket shell such as bicycle bottom bracket shell 505 shown in FIG. 12. As with other described embodiments, the bottom bracket shell may be an integrated bottom bracket shell portion of a bicycle frame 507, or it may be a separate shell which is configured to fit securely within the bottom bracket shell of the bicycle frame, for example by slip fitting, press fitting or the like. In the case of a separate shell, the shell may also be referred to as a shim. Further description of separate shells and shims is provided below with respect to FIGS. 13 and 14.

Left (or non-drive-side) bearing cup 502 defines a left bearing rotation axis A3, which is the axis passing through the center of the left bearing cup and oriented perpendicular to its end faces. Left bearing cup 502 includes a body portion 506 configured to be mounted within a left side portion of the shell, and a left bearing housing 508 configured to peripherally enclose a left bearing 510.

Body portion 506 includes a press-fit portion 512 located adjacent to left bearing housing 508. Press-fit portion 512 may be any suitable structure sized and configured to mount into a bottom bracket shell and to be retained therein by friction, for example by pressing the portion into the shell. For example, press-fit portion 512 may have a continuous outer diameter D that is configured such that the press-fit portion will fit tightly within the inner diameter of an expected bottom bracket shell. A press fit may also be referred to as a "friction fit" or an "interference fit."

Body portion 506 may include one or more apertures 514. Apertures 514 may be any suitably sized and shaped holes or openings in body portion 506 configured to reduce the weight of left bearing cup 502 and/or to facilitate the passing therethrough of one or more cables, wires, or the like (not shown). For example, as shown in FIGS. 9 and 10, apertures 514 may include circular holes spaced around the circumference of body portion 506 and passing from an outer surface 516 to an inner surface 518 of body portion 506.

Body portion 506 includes an expandable portion 520 at an end opposite the left bearing housing. Expandable portion 520 may be any suitable structure configured to be radially expandable while remaining connected to the remainder of body portion 506. For example, expandable portion 520 may include two or more fingers or segments 522 defined by slots 524. In the example shown, fingers 522 extend longitudinally along body portion 506. In other examples, fingers 522 may extend in a generally longitudinal direction, but may deviate from the linear arrangement shown. For example fingers 522 may spiral around the circumference of body portion 506 and/or may have shapes other than the substantially rectangular shape depicted. More or fewer fingers 522 than those shown in the drawing may be included. Fingers 522 may be defined by slots 524, with slots 524 each including a respective open end 526 and a respective closed end 528. Accordingly, fingers 522 may each include an attached proximal end 530 and a distal end 532 opposite the proximal end. This arrangement may allow each of the fingers to be elastically deformed or bent by urging, biasing, or mechanically displacing the distal ends in a generally radial direction. Expandable portion 520 may be described as a cylindrical collet.

Left bearing cup 502 and right bearing cup 504 are configured to releasably mate together. Accordingly, body portion 506 includes a mating surface 534 on inner surface 518. Mating surface 534 may include any suitable surface configured to releasably engage a complementary mating surface on right bearing cup 504. For example, mating surface 534 may include threaded surface 536 as shown in FIGS. 9 and 10, which is configured to mate in threaded engagement with a complementary threaded surface on right bearing cup 504. In other examples, mating surface 534 may include a lip, catch, latch, and/or connector.

Left bearing housing 508 may be substantially similar to any of the previously described bearing housings, and may include a lip 538 configured to interface directly or indirectly with a left face of the bottom bracket shell, such as a left face 539 of shell 505 in FIG. 12.

Right (or drive-side) bearing cup 504 defines a right bearing rotation axis A4 passing through the center of the right bearing cup and oriented perpendicular to its end faces, a right mounting portion 540 configured to be mounted within a right side portion of the shell, and a right bearing housing 542 configured to peripherally enclose a right bearing 544.

Right mounting portion 540 may include a tapered portion 546 and/or a mating portion 548. In the example shown in FIGS. 9 and 10, tapered portion 546 is disposed adjacent to right bearing housing 542, tapering from a larger diameter near the housing to a smaller diameter at an end farther from the housing. Tapered portion 546 may include any suitable structure configured to be at least partially insertable into expandable portion 520 and to mechanically urge fingers 522 of expandable portion 520 outward in a radial direction. In other words, tapered portion 546 may radially bias expandable portion 520 in an outward direction when inserted therein.

Mating portion 548 may include any suitable mating surface configured to mate with complementary mating surface 534. For example, mating portion 548 may include a cylindrical extension 550 extending from and coaxial with tapered portion 546, and cylindrical extension 550 may include a threaded outer surface 552 complementary to threads 536 on inner surface 518.

Right mounting portion 540 includes a mechanical stop 554. Mechanical stop 554 may include any suitable structure configured to prevent insertion of tapered portion 546 into expandable portion 520 beyond a certain predetermined depth. In the example shown in FIGS. 9 and 10, mechanical stop 554 includes a stepped annulus having a face 556 substantially perpendicular to axis A4. Face 556 is configured such that distal ends 532 of fingers 522 will strike the face and prevent further axial motion when right bearing cup 504 is inserted into left bearing cup 502. This interaction may be referred to as "bottoming out" the right bearing cup, because insertion of the right bearing cup is mechanically stopped and the cup in effect reaches "bottom" in terms of how far it may be inserted. In other examples, mechanical stop 554 may include a continuous or discontinuous ridge around the circumference of right bearing cup 504. In other examples, mechanical stop 554 may be disposed on left bearing cup 502 instead of or in addition to being disposed on the right bearing cup. For example, a ridge, annulus, or raised ring may be disposed on inner surface 518 of body portion 506, and may be configured such that a surface of the right bearing cup will strike and be halted by the ridge at a predetermined insertion depth.

In some examples, mechanical stop 554 may be configured to stop insertion of right bearing cup 504 once the right bearing cup has been inserted into left bearing cup 502 to a depth that corresponds or coincides with certain desired features. For example, reaching mechanical stop 554 may coincide with the distal ends of expandable portion 520 collectively reaching a desired predetermined outer diameter. Distal ends 532 of fingers 522 may each include a shell-contacting portion 557 which may be thicker than other portions of the respective fingers. The predetermined diameter may be substantially equal to press-fit portion diameter D, and in some examples may be approximately 42 mm. In some examples, the predetermined diameter may be approximately 0.1 mm larger than press-fit diameter D. Accordingly, fully inserting tapered portion 546 until stop 554 is reached may cause a press fit to exist at the expandable end of body portion 506 in addition to the press fit at press-fit portion 512, thereby more securely mounting bottom bracket system 500 within the bottom bracket shell.

A width W of bottom bracket system 500 is defined between the left bearing housing 508 and right bearing housing 542 when the left and right bearing cups are assembled together, as shown in FIG. 9. In some examples, reaching mechanical stop 554 may coincide with W reaching a desired predetermined width of the assembled bottom bracket.

The desired predetermined width may correspond to a width of the bottom bracket shell, as measured between opposing faces, such as indicated at W1 in FIG. 12. The predetermined width may be equivalent to the width of an expected bottom bracket shell. Due to inconsistency or variation in manufacturing and/or between manufacturers, the bottom bracket shell of a bicycle may be any one of a range of widths. Accordingly, bottom bracket system 500 may include one or more washers such as a washer 558. Washer 558 may be any suitable structure configured to fit around body portion 506 and to contact both lip 538 and an external face of the bottom bracket shell when left bearing cup 502 is mounted in the shell. Washer 558 may be compressible and/or elastic, allowing the washer to flexibly account for a difference between the width of the shell and the expected width. Washer 558 may be referred to as a "tolerance O-ring."

Left bearing cup 502 and right bearing cup 504 are constructed such that threading right bearing cup 504 into left bearing cup 502 causes axis A3 to align with axis A4, thereby making the bearing cups concentric and ensuring the bearings are parallel with each other. Accordingly, mounting the system into a shell by fully threading right bearing cup 504 into left bearing cup 502 results in a secure press fit at both the left and right ends of the shell due to the press-fit portion and the expanded expandable portion, respectively, a secure side-to-side fit due to the predetermined width and the tolerance o-ring, and concentric and parallel bearings properly aligned to receive and support a crankset spindle.

As with systems described above, a spindle (such as spindle 30 in FIG. 1) may be configured to be disposable through the bottom bracket shell, left bearing cup 502, and right bearing cup 504. As with those other systems, the spindle will typically have a diameter chosen to conform closely to the inner diameter of the cups and bearings. System 500 may be configured to facilitate installation of a Shimano crankset having a 24 mm spindle into an oversized bottom bracket shell that typically utilizes a 30 mm spindle. Accordingly, system 500 may be referred to as a "bottom bracket adapter" or "conversion bottom bracket." Examples of such shells include those referred to in the art as BB30, PF30, and/or OSBB.

Figure 13:
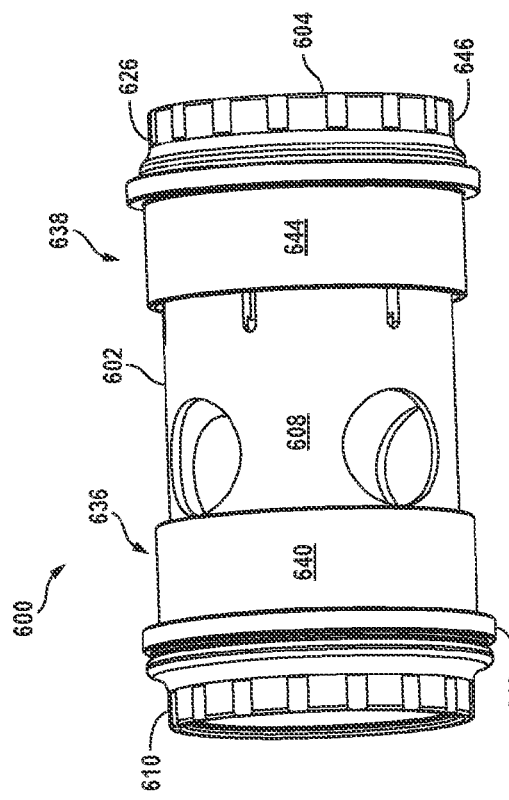
FIG. 13 is an assembled isometric view of a seventh alternative bottom bracket system, according to aspects of the present teachings.
Figure 14:
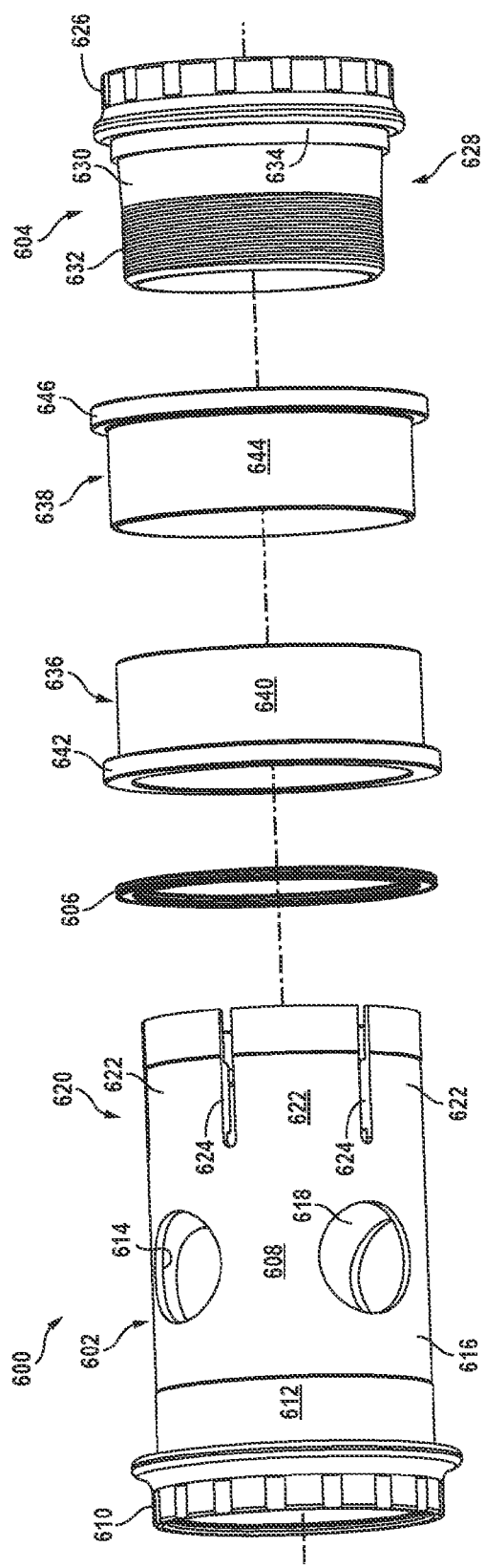
FIG. 14 is an exploded isometric view of the system of FIG. 13.

Certain expected examples of oversized shells may have inner diameters larger than the outer diameter of system 500 and/or may have widths smaller than the assembled width of system 500. Accordingly, additional shims or shells may be required to facilitate mounting. FIGS. 13 and 14 depict another bottom bracket system, generally indicated at 600, which is an embodiment of a system 500 described above that includes such shims. FIG. 13 is an isometric assembled view and FIG. 14 is an isometric exploded view of system 600.

System 600 may be substantially similar to system 500, and thus may include a left bearing cup 602 a right bearing cup 604, and a washer 606. As above, left bearing cup 602 may include a body portion 608 and a left bearing housing 610. Body portion 608 may include a press-fit portion 612, apertures 614, an outer surface 616, an inner surface 618, and an expandable portion 620 having fingers or segments 622 separated by slots 624, all substantially as described regarding system 500. Similarly, right bearing cup 604 may include a right bearing housing 626 and a right mounting portion 628 including a tapered portion 630, a threaded mating portion 632, and a mechanical stop 634, again all substantially as described regarding system 500.

In the example of system 600 shown, a left shim 636 and a right shim 638 are included. Left shim 636 includes a left sleeve portion 640 and a left flange portion 642, and right shim 638 includes a right sleeve portion 644 and a right flange portion 646. The respective sleeve portions may be configured to facilitate proper positioning of the shim within the bottom bracket shell and/or may be configured to adapt the inner diameter of the bottom bracket shell to the outer diameter of the bottom bracket system (e.g., press-fit portion 612 or expandable portion 620). In other words, each sleeve portion may include an outer diameter configured to conform to an inner surface of the bottom bracket shell and an inner diameter configured to conform to an outer surface of the bottom bracket. Respective flange portions may be configured to adapt the width of the bottom bracket shell of the bicycle to the width of the assembled system 600. As described above, washer 606 may be included to account for inconsistencies.

In other examples, only a single shim may be included, the single shim may only include the sleeve portion, and the sleeve portion may be substantially the same width as the bottom bracket shell of the bicycle. In the single shim example, the shim may be substantially equivalent to the shells shown in FIGS. 1-7 and described above. The shim or shims may be configured to be press fit into the bottom bracket shell of a bicycle. Accordingly, descriptions above regarding mounting of the bottom bracket system into a bicycle bottom bracket shell would correspondingly apply to mounting the system into a shell with a shim or shims previously installed, except that the cups would be mounted within the shim or shims rather than directly within the shell.

It is noted that the various components and subcomponents of systems 500 and 600 may be interchangeable or combined with each other and with the various components and subcomponents of systems 10, 60, 110, 160, 210, and/or 300 to create additional combinations and/or subcombinations in accordance with the teachings of this disclosure.

Figure 15:
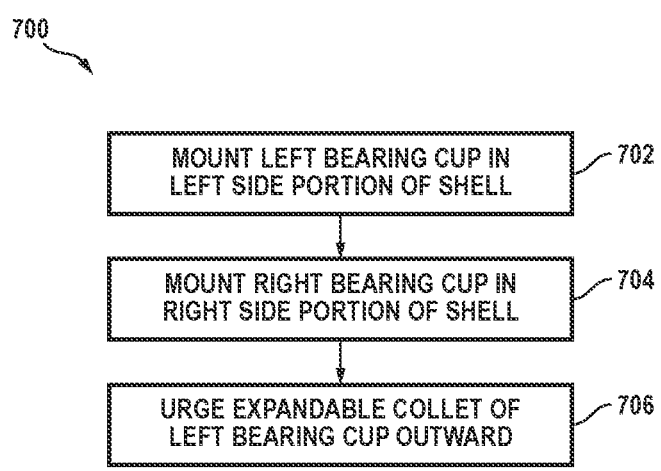
FIG. 15 is a flowchart depicting another method of installing a bottom bracket in a bicycle frame, according to aspects of the present teachings.

FIG. 15 is a flowchart depicting a method, generally indicated at 700, of installing a bottom bracket in a bicycle frame according to aspects of the present teachings.

Step 702 of method 700 includes mounting a left bearing cup in a left side portion of a bottom bracket shell of the bicycle frame by pressing the left bearing cup into the bottom bracket shell. The left bearing cup may include an expandable collet portion at a right end. In some examples, a washer may be mounted on the left bearing cup before mounting the left bearing cup in the left side portion of the bottom bracket shell. The washer may be configured to be disposed around an outer diameter of the left bearing cup, between a lip of a left bearing housing of the left bearing cup and a left face of the bottom bracket shell.

In some examples, a cylindrical shim may first be mounted in the bottom bracket shell. In these examples, mounting the left bearing cup in the left side portion of the bottom bracket shell may include mounting the left bearing cup in the cylindrical shim. As described above, the shim may be a partial shim, in which case two shims may be installed, one on either side of the bottom bracket shell. In other examples, the shim may be a complete shim, meaning the shim may extend through the entire bottom bracket shell. The shim or shims may be configured to function as a spacer in the radial and/or axial directions.

Step 704 includes mounting a right bearing cup in a right side portion of the bottom bracket shell. In some examples, this step may include engaging a threaded inner surface of the left bearing cup with a threaded outer surface of the right bearing cup.

Step 706 includes biasing, urging, or mechanically displacing the expandable collet portion of the left bearing cup outward by engaging an inner surface of the collet portion with a tapered outer surface of the right bearing cup. In some examples, this step may include inserting the right bearing cup into the left bearing cup until a mechanical stop is reached. In some examples, reaching the mechanical stop may coincide with reaching a desired outer diameter of the collet portion. In some examples, reaching the mechanical stop may coincide with reaching a desired bottom bracket width corresponding to a width of the bottom bracket shell.

Based on the above description and the associated drawings, the following examples describe various embodiments of apparatuses and methods of the disclosure.

In the examples described above, the left bearing cup includes the expandable collet portion and the right bearing cup is configured to expand the collet portion by threading into the left bearing cup. In other examples, the collet portion may be disposed on the right bearing cup, and the left bearing cup may expand the collet portion by threading into the right bearing cup. In other examples, both cups may be press-fit into the bottom bracket shell. In some examples, the left and right bearing cups may snap, latch, and/or twist-lock together rather than or in addition to threading together. In some examples, a bottom bracket system may be configured as an adapter or conversion system to facilitate installation of certain cranksets on bicycle frames having bottom bracket shells originally configured to accommodate cranksets of a different spindle diameter.

In another example, a bicycle bottom bracket may include a left bearing cup including a left bearing housing at a first end and a radially-expandable portion at a second end opposite the first end, and a right bearing cup including a right bearing housing at a first end and a tapered portion disposed between the right bearing housing and a second end opposite the first end. The tapered portion may be configured to at least partially fit within the radially-expandable portion of the left bearing cup. Inserting the second end of the right bearing cup into the second end of the left bearing cup may cause the radially-expandable portion to expand to a predetermined diameter.

In another example, a bicycle bottom bracket may include a non-drive-side bearing cup including a body portion configured to be mounted within a bottom bracket shell, and a first bearing housing disposed at a first end of the body portion and configured to peripherally enclose a first bearing. The body portion may have a press-fit portion disposed adjacent the first bearing housing and an expandable portion disposed at a second end of the body portion opposite the first end. The bottom bracket may also include a drive-side bearing cup including a tapered portion configured to at least partially fit within the expandable portion of the non-drive-side bearing cup, and a second bearing housing disposed adjacent the tapered portion and configured to peripherally enclose a second bearing. The non-drive-side bearing cup and the drive-side bearing cup may be configured to releasably mate together such that the tapered portion inserts into the expandable portion and causes the expandable portion to radially expand to a predetermined diameter.

The press-fit portion of the non-drive-side bearing cup may have an outer diameter substantially equal to the predetermined diameter of the expandable portion.

The non-drive-side bearing cup and the drive-side bearing cup may include mutually complementary threaded surfaces.

A mechanical stop may be included and configured to prevent insertion of the drive-side bearing cup into the non-drive-side bearing cup beyond a predetermined depth. The non-drive-side bearing cup may be further configured to reach the predetermined diameter when the drive-side bearing cup is inserted to the predetermined depth. The bottom bracket may further include an assembled width defined between the first bearing housing and the second bearing housing, and the bottom bracket may be further configured such that the assembled width corresponds to an expected width of the bottom bracket shell when the drive-side bearing cup is inserted to the predetermined depth.

The body portion may further include a plurality of apertures, each aperture passing from an outer surface of the body portion to the inner surface.

The bottom bracket may include a washer configured to contact both a face of the bottom bracket shell and a lip of the first bearing housing when the bottom bracket is mounted within the bottom bracket shell.

The bottom bracket may include a cylindrical shim having an outer diameter configured to conform to an inner surface of the bottom bracket shell and an inner diameter configured to conform to an outer surface of the bottom bracket.

The expandable portion may include a plurality of generally longitudinal fingers, the fingers spaced apart by slots, each slot having an open end at the second end of the body portion.

In another example, a bicycle may include a bicycle frame including a bottom bracket shell. A left bearing cup may include a body portion configured to be mounted within the bottom bracket shell, a left bearing housing disposed at a first end of the body portion and configured to peripherally enclose a left bearing, the body portion having a press-fit portion disposed adjacent the left bearing housing and a radially-expandable portion disposed at a second end of the body portion opposite the first end. A right bearing cup may include a tapered portion configured to be insertable within the radially-expandable portion of the left bearing cup, and a right bearing housing adjacent the tapered portion configured to peripherally enclose a right bearing. A spindle may be disposable through the shell, the left bearing cup, and the right bearing cup. The tapered portion and the expandable portion may be configured to contact each other such that the tapered portion radially urges the expandable portion toward an expanded diameter substantially equivalent to a diameter of the press-fit portion.

The radially-expandable portion may include a plurality of substantially longitudinal segments separated by slots formed in the left bearing cup.

The radially-expandable portion may include a cylindrical collet.

The right bearing cup may include a mechanical stop configured to prevent insertion of the tapered portion beyond a predetermined depth. The expandable portion, the tapered portion, and the mechanical stop may be configured such that the insertion of the tapered portion to the predetermined depth coincides with causing the radially-expandable portion to reach the expanded diameter.

The left and right bearing cups may be configured to mate together by threaded engagement. The left bearing cup may include an inner surface having a first threaded portion, and the right bearing cup may include an outer surface having a second threaded portion complementary to the first threaded portion.

An illustrative method for installing a bottom bracket in a bicycle frame may include mounting a left bearing cup in a left side portion of a bottom bracket shell of the bicycle frame by pressing the left bearing cup into the bottom bracket shell. The left bearing cup may include an expandable collet portion at a right end of the left bearing cup. A right bearing cup may be mounted in a right side portion of the bottom bracket shell. The expandable collet portion of the left bearing cup may be biased or urged outward by engaging an inner surface of the collet portion with a tapered outer surface of the right bearing cup.

Urging the expandable collet portion of the left bearing cup outward may include inserting the right bearing cup into the left bearing cup until a mechanical stop is reached. Reaching the mechanical stop may coincide with reaching a desired outer diameter of the collet portion. Reaching the mechanical stop may coincide with reaching a desired bottom bracket width corresponding to a width of the bottom bracket shell.

A washer may be mounted on the left bearing cup before mounting the left bearing cup in the left side portion of the bottom bracket shell. The washer may be configured to be disposed around an outer diameter of the left bearing cup, between a lip of a left bearing housing of the left bearing cup and a left face of the bottom bracket shell.

A cylindrical shim may be mounted in the bottom bracket shell. Mounting the left bearing cup in the left side portion of the bottom bracket shell may include mounting the left bearing cup in the cylindrical shim.

Mounting the right bearing cup in the right side portion of the bottom bracket shell may include engaging a threaded inner surface of the left bearing cup with a threaded outer surface of the right bearing cup.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A bicycle bottom bracket comprising:
a left bearing cup including a left bearing housing at a first end and a radially-expandable portion at a second end opposite the first end; and
a right bearing cup including a right bearing housing at a first end and a tapered portion disposed between the right bearing housing and a second end opposite the first end, the tapered portion configured to at least partially fit within the radially-expandable portion of the left bearing cup;
wherein inserting the second end of the right bearing cup into the second end of the left bearing cup causes the radially-expandable portion to expand to a predetermined diameter.

2. A bicycle bottom bracket comprising:
a non-drive-side bearing cup including a body portion configured to be mounted within a bottom bracket shell, a first bearing housing disposed at a first end of the body portion and configured to peripherally enclose a first bearing, the body portion having a press-fit portion disposed adjacent the first bearing housing, and an expandable portion disposed at a second end of the body portion opposite the first end; and
a drive-side bearing cup including a tapered portion configured to at least partially fit within the expandable portion of the non-drive-side bearing cup, and a second bearing housing disposed adjacent the tapered portion and configured to peripherally enclose a second bearing;
wherein the non-drive-side bearing cup and the drive-side bearing cup are configured to releasably mate together such that the tapered portion inserts into the expandable portion and causes the expandable portion to radially expand to a predetermined diameter.

3. The bottom bracket of claim 2, wherein the press-fit portion of the non-drive-side bearing cup has an outer diameter substantially equal to the predetermined diameter of the expandable portion.

4. The bottom bracket of claim 2, wherein the non-drive-side bearing cup and the drive-side bearing cup include mutually complementary threaded surfaces.

5. The bottom bracket of claim 2, further comprising a mechanical stop configured to prevent insertion of the drive-side bearing cup into the non-drive-side bearing cup beyond a predetermined depth.

6. The bottom bracket of claim 5, wherein the non-drive-side bearing cup is further configured to reach the predetermined diameter when the drive-side bearing cup is inserted to the predetermined depth.

7. The bottom bracket of claim 5, wherein the bottom bracket further includes an assembled width defined between the first bearing housing and the second bearing housing, and the bottom bracket is further configured such that the assembled width corresponds to an expected width of the bottom bracket shell when the drive-side bearing cup is inserted to the predetermined depth.

8. The bottom bracket of claim 2, the body portion further including a plurality of apertures, each aperture passing from an outer surface of the body portion to the inner surface.

9. The bottom bracket of claim 2, further comprising a washer configured to contact both a face of the bottom bracket shell and a lip of the first bearing housing when the bottom bracket is mounted within the bottom bracket shell.

10. The bottom bracket of claim 2, further comprising a cylindrical shim having an outer diameter configured to conform to an inner surface of the bottom bracket shell and an inner diameter configured to conform to an outer surface of the bottom bracket.

11. The bottom bracket of claim 2, wherein the expandable portion comprises a plurality of generally longitudinal fingers, the fingers spaced apart by slots, each slot having an open end at the second end of the body portion.

12. A bicycle comprising:
a bicycle frame including a bottom bracket shell;
a left bearing cup including a body portion configured to be mounted within the bottom bracket shell, a left bearing housing disposed at a first end of the body portion and configured to peripherally enclose a left bearing, the body portion having a press-fit portion disposed adjacent the left bearing housing and a radially-expandable portion disposed at a second end of the body portion opposite the first end;
a right bearing cup including a tapered portion configured to be insertable within the radially-expandable portion of the left bearing cup, and a right bearing housing adjacent the tapered portion configured to peripherally enclose a right bearing; and a spindle disposable through the shell, the left bearing cup, and the right bearing cup;

wherein the tapered portion and the expandable portion are configured to contact each other such that the tapered portion radially urges the expandable portion toward an expanded diameter substantially equivalent to a diameter of the press-fit portion.

13. The bicycle of claim 12, wherein the radially-expandable portion comprises a plurality of substantially longitudinal segments separated by slots formed in the left bearing cup.

14. The bicycle of claim 12, wherein the radially-expandable portion comprises a cylindrical collet.

15. The bicycle of claim 12, the right bearing cup further comprising a mechanical stop configured to prevent insertion of the tapered portion beyond a predetermined depth.

16. The bicycle of claim 15, wherein the expandable portion, the tapered portion, and the mechanical stop are further configured such that the insertion of the tapered portion to the predetermined depth coincides with causing the radially-expandable portion to reach the expanded diameter.

17. The bicycle of claim 12, wherein the left and right bearing cups are configured to mate together by threaded engagement.

18. The bicycle of claim 17, the left bearing cup further comprising an inner surface having a first threaded portion, and the right bearing cup further comprising an outer surface having a second threaded portion complementary to the first threaded portion.

19. A method of installing a bottom bracket in a bicycle frame, the method comprising:

mounting a left bearing cup in a left side portion of a bottom bracket shell of the bicycle frame by pressing the left bearing cup into the bottom bracket shell, the left bearing cup including an expandable collet portion at a right end of the left bearing cup;

mounting a right bearing cup in a right side portion of the bottom bracket shell; and urging the expandable collet portion of the left bearing cup outward by engaging an inner surface of the collet portion with a tapered outer surface of the right bearing cup.

20. The method of claim 19, wherein urging the expandable collet portion of the left bearing cup outward further includes inserting the right bearing cup into the left bearing cup until a mechanical stop is reached.

21. The method of claim 20, wherein reaching the mechanical stop coincides with reaching a desired outer diameter of the collet portion.

22. The method of claim 21, wherein reaching the mechanical stop coincides with reaching a desired bottom bracket width corresponding to a width of the bottom bracket shell.

23. The method of claim 19, further including mounting a washer on the left bearing cup before mounting the left bearing cup in the left side portion of the bottom bracket shell, wherein the washer is configured to be disposed around an outer diameter of the left bearing cup, between a lip of a left bearing housing of the left bearing cup and a left face of the bottom bracket shell.

24. The method of claim 19, further including mounting a cylindrical shim in the bottom bracket shell, and wherein mounting the left bearing cup in the left side portion of the bottom bracket shell includes mounting the left bearing cup in the cylindrical shim.

25. The method of claim 19, wherein mounting the right bearing cup in the right side portion of the bottom bracket shell includes engaging a threaded inner surface of the left bearing cup with a threaded outer surface of the right bearing cup.

\* \* \* \* \*